(12) United States Patent
Rayner et al.

(10) Patent No.: US 10,097,078 B2
(45) Date of Patent: Oct. 9, 2018

(54) MULTI-MODE ENERGY ROUTER

(71) Applicant: Toshiba International Corporation, Houston, TX (US)

(72) Inventors: Mark Douglas Rayner, Houston, TX (US); Yu Liu, Katy, TX (US); Richard Robert Gerhold, Cypress, TX (US); Da Jiao, Flushing, NY (US)

(73) Assignee: Toshiba International Corporation, Houston, TX (US)

( * ) Notice: Subject to any disclaimer, the term of this patent is extended or adjusted under 35 U.S.C. 154(b) by 413 days.

(21) Appl. No.: 14/886,671

(22) Filed: Oct. 19, 2015

(65) Prior Publication Data

US 2016/0111971 A1    Apr. 21, 2016

Related U.S. Application Data

(60) Provisional application No. 62/066,475, filed on Oct. 21, 2014.

(51) Int. Cl.
| | |
|---|---|
| *H02J 1/10* | (2006.01) |
| *H02J 3/38* | (2006.01) |
| *H02M 1/14* | (2006.01) |
| *H02M 3/158* | (2006.01) |
| *H02M 7/5387* | (2007.01) |

(52) U.S. Cl.
CPC ........... *H02M 1/14* (2013.01); *H02M 3/1584* (2013.01); *H02M 7/5387* (2013.01); *H02M 2003/1586* (2013.01)

(58) Field of Classification Search
CPC .... H02M 1/14; H02M 3/1584; H02M 7/5387; H02M 2003/1586
USPC .......................................................... 307/52
See application file for complete search history.

(56) References Cited

U.S. PATENT DOCUMENTS

| | | | | |
|---|---|---|---|---|
| 2012/0261999 A1* | 10/2012 | Parkhideh | ................. | H02J 3/38 307/80 |
| 2013/0285459 A1* | 10/2013 | Jaoui | ......................... | H02J 3/32 307/80 |
| 2014/0327405 A1* | 11/2014 | Carkner | .................. | H02J 7/007 320/128 |
| 2016/0096437 A1* | 4/2016 | Tripathi | .................. | H02J 3/381 307/31 |

* cited by examiner

*Primary Examiner* — Richard Tan
(74) *Attorney, Agent, or Firm* — Baker Botts L.L.P.

(57) ABSTRACT

In accordance with presently disclosed embodiments, a multi-mode energy router (MMER) is provided. The MMER includes a functional block of power electronics under processor control. In addition, the MMER includes a plurality of switches that can be controlled to route power from specific sources or loads to the input or output of the functional block. The MMER enables a single functional block of power electronics to selectively provide bi-directional power conversion between AC and DC components and between DC and DC components.

21 Claims, 19 Drawing Sheets

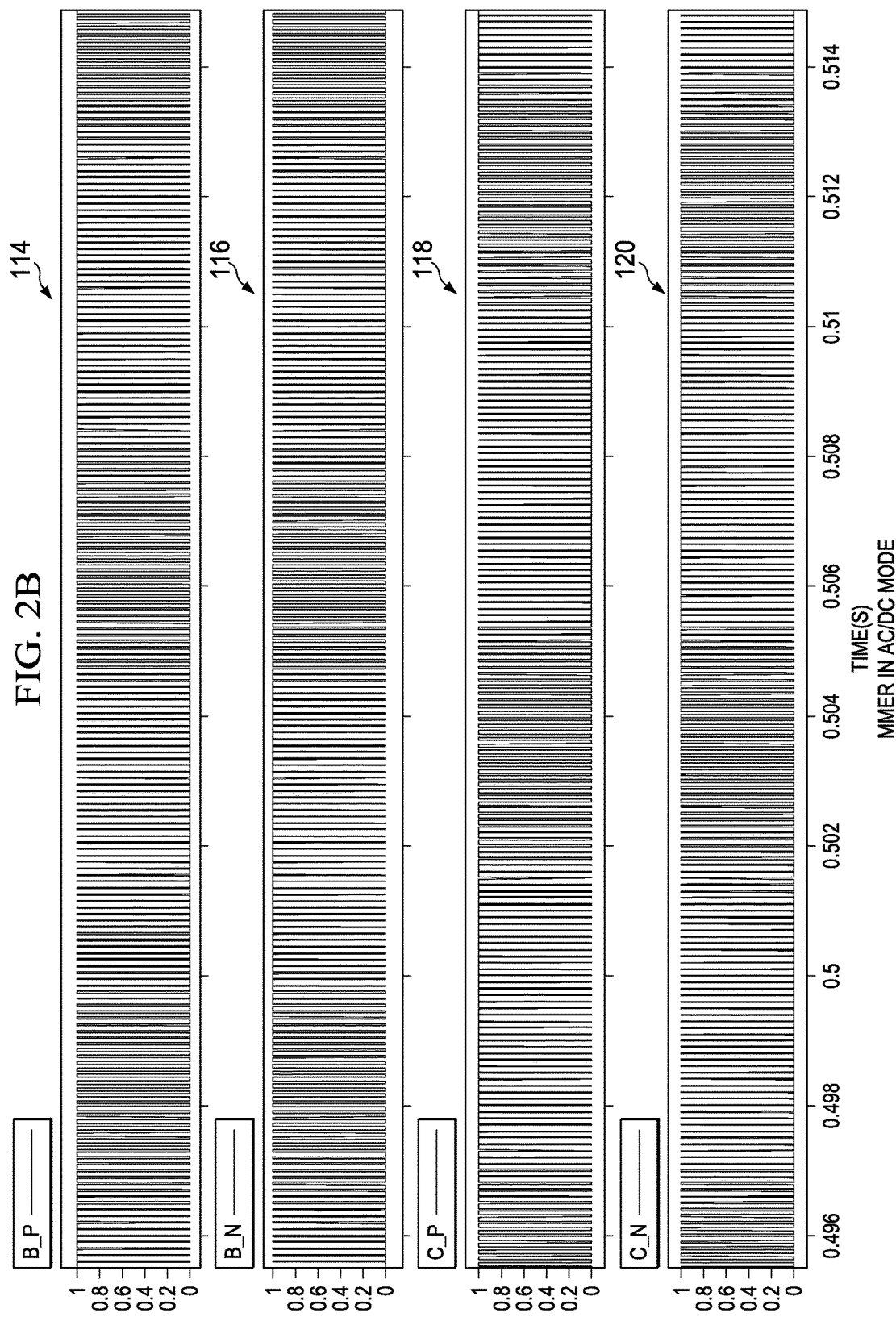

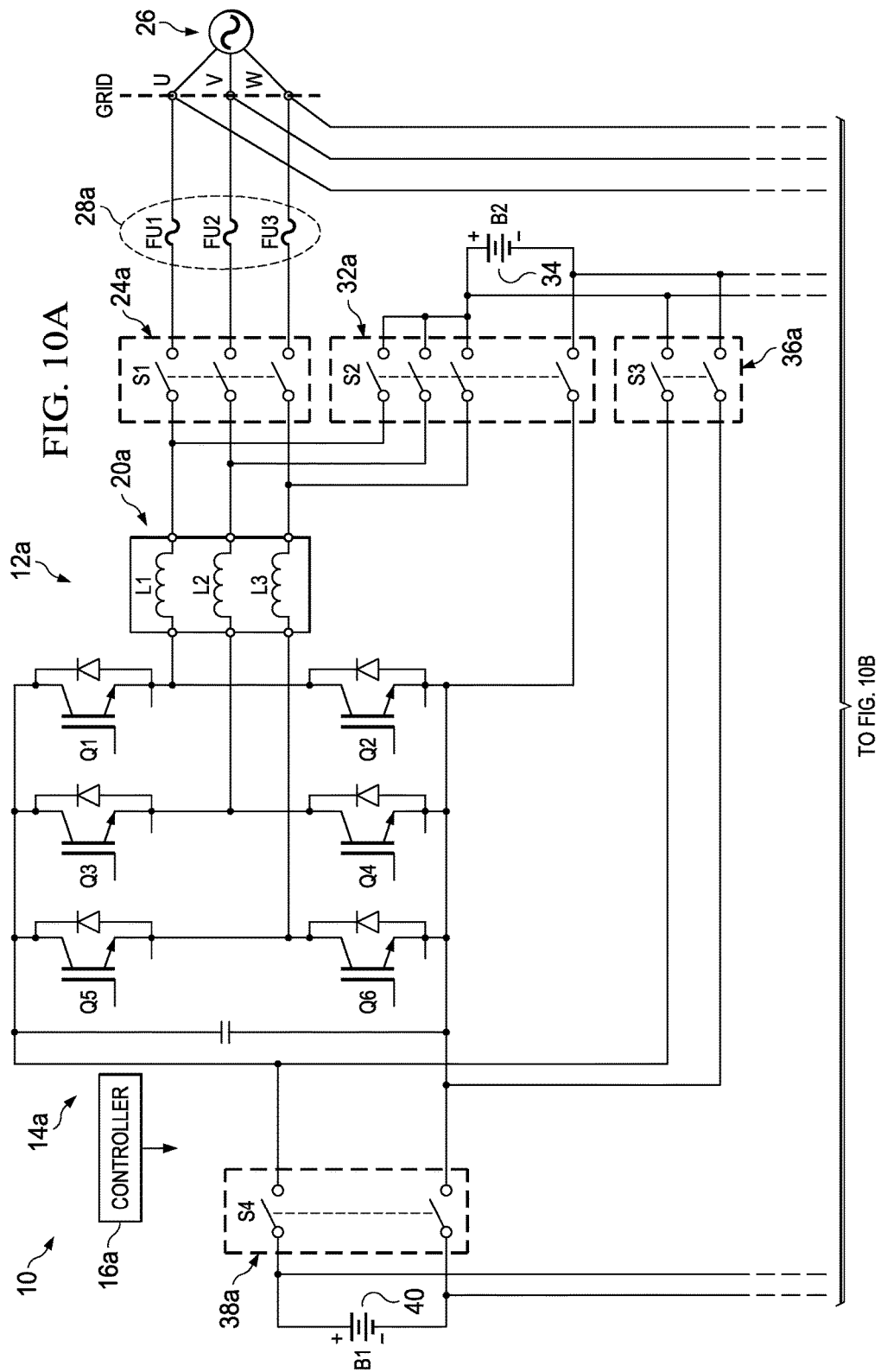

MULTI-MODE ENERGY ROUTER

CROSS REFERENCE TO RELATED APPLICATIONS

This application is a non-provisional of U.S. Provisional Application Ser. No. 62/066,475, entitled "Multi-Mode Energy Router," filed Oct. 21, 2014, which is herein incorporated by reference in its entirety.

TECHNICAL FIELD

Embodiments of the present disclosure relate to power flow control systems and, more particularly, to a multi-mode energy router used to control a flow of power between multiple different sources and loads.

BACKGROUND

Traditional power electronic applications usually involve delivering power from one or more specific sources in a controlled fashion to a specific load. Often these power sources are either alternating current (AC) or direct current (DC) sources, and the loads are alternating current (AC) or direct current (DC) loads. Existing power conversion equipment utilizes one or more sets of specific fixed function hardware to provide the desired power from a source to a load. For example, the fixed function hardware generally includes a rectifier for AC to DC power conversion, a converter for DC to DC power conversion, or an inverter for DC to AC power conversion.

Some distributed power generation applications involve power conversion between devices that can act either as sources of electrical power or loads for electrical power. Examples of such bi-directional sources/loads include battery systems and regenerative-mode motors. Distributed power generation often involves treating multiple sources, or loads, of electrical power that are AC, DC, or can switch from one to the other. Examples of such sources or loads include micro-grid systems that tie the AC power grid with DC photovoltaic (PV) panels.

Utilizing existing power electronics and control systems for multi-source or multi-load, bidirectional, AC/DC power flow applications can result in systems that lack flexibility. Such systems are often implemented with several separate conversion stages, resulting in reduced power efficiency and higher system cost.

SUMMARY

In accordance with the above, presently disclosed embodiments are directed to a power conversion system that utilizes a single functional block of power electronics to convert power bi-directionally between a variety of sources and loads having different electrical modes of operation. The power conversion system includes a multi-mode energy router (MMER) having the functional block of power electronics. The functional block may include a triple half bridge architecture. The MMER also includes a plurality of switches used to selectively couple the different component sources and loads to the power electronics, depending on a desired power conversion operation to be performed. A controller may control operation of the power electronics and the switches to enable various power conversion operations.

The disclosed MMER may utilize just one power conversion stage to convert energy between AC and DC sources or loads, between two DC source/loads, or a combination thereof. Accordingly, the MMER may facilitate a more efficient power conversion operation than is available through existing power converter systems. In addition, the MMER may enable a more flexible and scalable arrangement for converting power between a variety of source and load components. Furthermore, the MMER may include fewer hardware components than traditional power conversion systems, thereby decreasing cost of the system

BRIEF DESCRIPTION OF THE DRAWINGS

For a more complete understanding of the present disclosure and its features and advantages, reference is now made to the following description, taken in conjunction with the accompanying drawings, in which:

FIGS. 2A and 2B are a series of plots illustrating a switching control scheme for the multi-mode energy router of FIG. 1 when it is operated in AC/DC mode, in accordance with an embodiment of the present disclosure;

FIGS. 10A and 10B illustrate a schematic circuit diagram of a power conversion system using two multi-mode energy routers to connect two loads/sources and a power grid, in accordance with an embodiment of the present disclosure;

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Semiconductor power electronics are considered to be reliable, efficient components for use in power conversion systems. Such power conversion systems utilize these components connected in advanced designs to form various functional blocks to perform the desired power conversion steps. In addition, the power conversion systems benefit from increased processor-based computational capability, which provides sophisticated timing and control of semiconductor power devices used in the functional blocks. However, these advanced power conversion systems can lack flexibility since each functional block is often tailored to perform a specified power conversion step (e.g., inverter, rectifier, transformer, etc.). Presently disclosed power conversion systems utilize a functional block that performs multiple different conversion steps depending on what sources and/or loads are hooked up to the functional block. As described in detail below, this enables a more flexible (e.g., bi-directional and multi-modal) power conversion system than would be available using traditional combinations of power conversion functional blocks.

Figure 1:
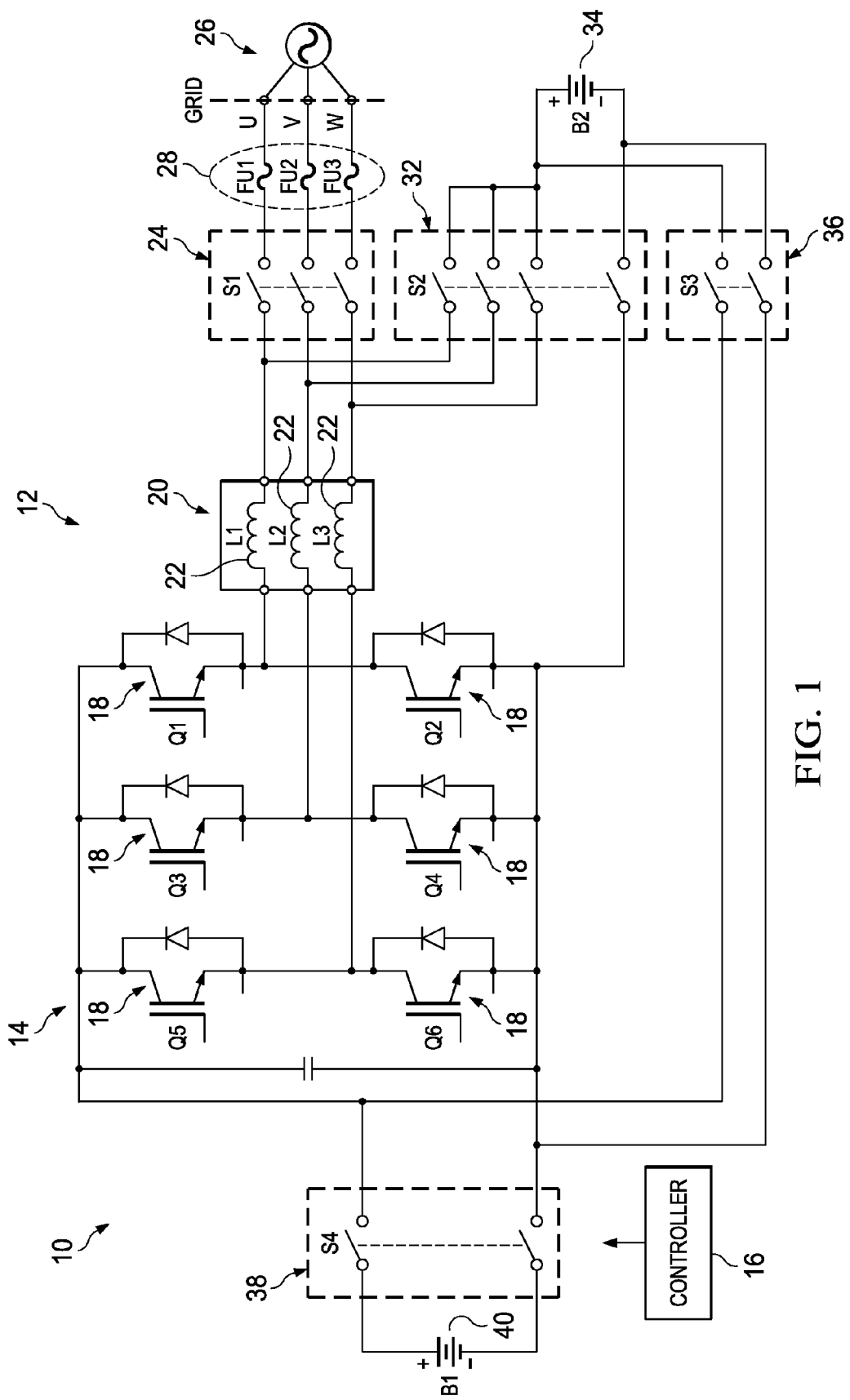
FIG. 1 is a schematic circuit diagram of a multi-mode energy router, in accordance with an embodiment of the present disclosure.

Turning now to the drawings, FIG. 1 illustrates an embodiment of a power conversion system 10 that includes a multi-mode energy router (MMER) 12. The MMER 12 includes a functional block 14 of power electronics under processor control. The power conversion system 10 includes a controller 16 having a processor and a memory for controlling the power electronics of the MMER 12, among other things. It should be noted that the term "controller 16" in the present disclosure may refer to one or more controller having a processor and/or memory that are communicatively coupled to each other to perform the desired control tasks. The functional block 14 of power electronics may include a triple half bridge bi-directional converter/inverter functional power control building block. Although the illustrated embodiment features three half bridge units to provide 3 phase power conversion, other embodiments may utilize more or less than three half bridge units depending on the requirements of the application. Under processor control of the controller 16, the functional block 14 may provide AC to DC (AC-DC), DC to DC (DC-DC), or DC to AC (DC-AC) power conversion functions or, in some cases, simultaneous combinations of these functions. Thus, the functional block 14 may function as a universal power flow (UPF) building block for electricity conversion.

In the illustrated embodiment, the functional block 14 may include a triple half bridge converter/inverter having six transistors 18 (e.g., IGBTs) used to convert power between different modes. The transistors (Q1-Q6) 18 are individually controlled by the controller 16 to convert incoming power to a desired AC or DC power output. The MMER 12 also may include a block 20 of inductors 22 (L1-L3) coupled to the functional block 14. As described in detail below, the block 20 of inductors 22 may act as a storage element in some power conversion modes (e.g., DC-DC), or as a power conditioning filter in other modes (e.g., AC-DC).

The controller 16 may carefully control the individual transistors 18 so that the main functional block 14 can operate in a range of power conversion modes as desired to convert power between multiple different components. In some embodiments, the controller 16 may provide interleaved control of the transistors 18 to allow for this individualized control. The controller 16 may control the transistors 18 to selectively operate the functional block 14 as a power inverter that changes incoming DC power to AC power, to operate the functional block 14 as a rectifier that changes incoming AC power to DC power, or to operate the functional block 14 to act as a DC-DC converter (e.g., buck or boost converter) that changes incoming DC power from one voltage to another. In some embodiments, the transistors 18 may be controlled to operate the functional block 14 in multiple modes at once.

FIGS. 2-5 illustrate various switching schemes for the transistors 18 in the functional block 14, which may be implemented via the controller 16. Specifically, FIGS. 2-5 illustrate different control schemes for operating the transistors 18 when the MMER 12 is operated in AC/DC mode, in DC/DC buck mode, in DC/DC boost mode, and in a three-phase interleaved DC/DC boost mode, respectively.

Figure 2A:
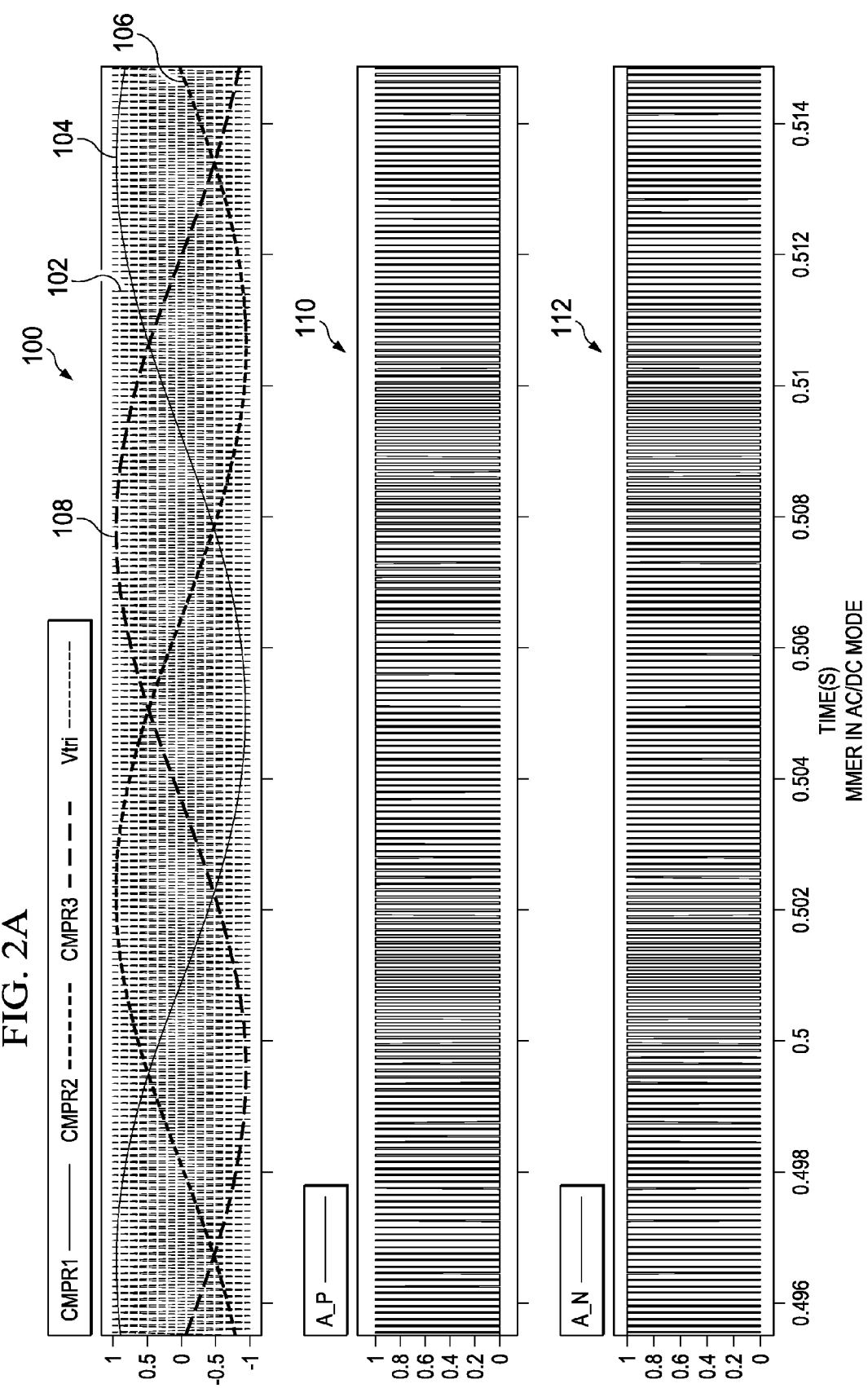

FIGS. 2A and 2B show the gate signals of six IGBTs (transistors 18 of FIG. 1) when the MMER is operated in AC/DC mode. In this AC/DC mode, MMER may be controlled as a traditional grid-tie inverter/rectifier. FIG. 2A includes a first plot 100 showing a carrier signal 102 (10 kHz triangular waveform) and reference signal (sinusoidal waveform) of U, V, and W in three phases. These signals from U, V, and W may be signals indicative of current flowing from/to the grid. The illustrated CMPR1 104, CMPR2 106, and CMPR3 108 represent the reference signals of the phases U, V, and W, respectively.

FIGS. 2A and 2B also includes several plots 110, 112, 114, 116, 118, and 120 showing the gate signals of six different IGBTs that may form the functional block 14 of FIG. 1. Specifically, the plot 110 illustrates a gate signal A_P for the upper IGBT labeled Q1 shown in FIG. 1. Similarly, the plot 112 illustrates a gate signal A_N for the lower IGBT labeled Q2. The plot 114 illustrates a gate signal B_P for the upper IGBT labeled Q3, and the plot 116 illustrates a gate signal B_N for the corresponding lower IGBT labeled Q4. Furthermore, the plot 118 illustrates a gate signal C_P for the upper IGBT labeled Q5, while the plot 120 illustrates a gate signal C_N for the corresponding lower IGBT labeled Q6.

The controller 16 of FIG. 1 may operate the functional block 14 of transistors in an AC/DC conversion mode according to the control logic provided below. In the below expression 1, the value Vtri represents the voltage value of the triangular waveform carrier signal 102 shown in the first plot 100 of FIG. 2A.

If Vtri>CMPR1, A_P=1, A_N=0;

If Vtri<CMPR1, A_P=0, A_N=1;

If Vtri>CMPR2, B_P=1, B_N=0;

If Vtri<CMPR2, B_P=0, B_N=1;

If Vtri>CMPR3, C_P=1, C_N=0;

If Vtri<CMPR3, C_P=0, C_N=1. (1)

FIGS. 3 and 4 show the gate signals of six IGBTs (transistors 18 of FIG. 1) when the MMER is operated in DC/DC mode. The MMER 12 can realize bi-directional power flow between source/loads B1 (e.g., 40 of FIG. 1) and B2 (e.g., 34 of FIG. 2), as described in detail below. When the MMER 12 operates as a buck converter, power may be controlled to flow from B1 to B2. In the DC/DC buck mode, lower IGBTs Q2, Q4, and Q6 of the functional block 14 may be controlled "off" at all times, such that they are used as freewheeling diodes. When the MMER 12 operates as a boost converter, power may be controlled to flow from B2 to B1. In the DC/DC boost mode, upper IGBTs Q1, Q3, and Q5 of the functional block 14 may be controlled "off" at all times, such that they are used as freewheeling diodes. In both the buck and boost DC/DC conversion modes, the three branches of the functional block 14 may be controlled independently as three buck or boost converters.

Figure 3A:
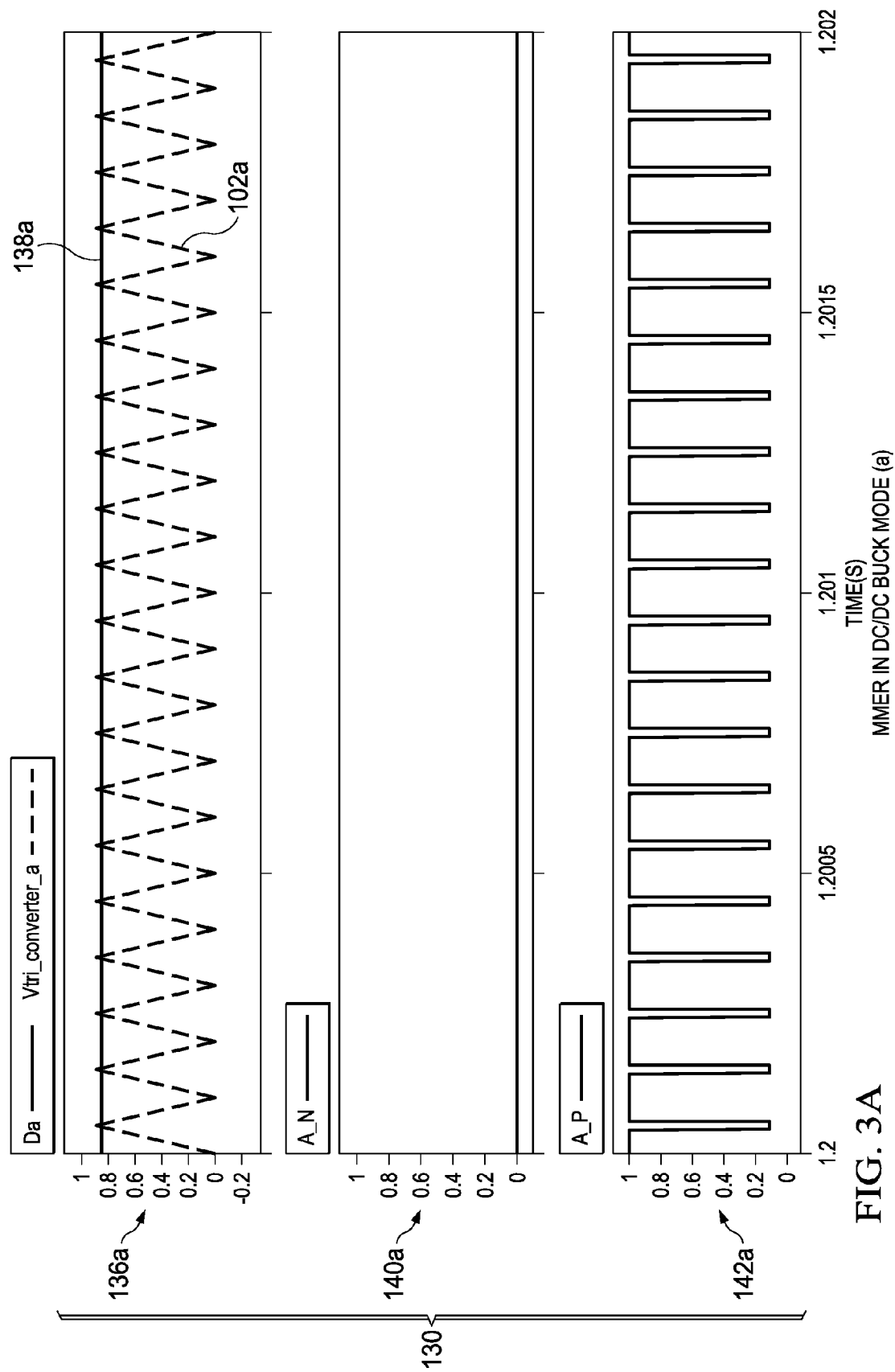
FIGS. 3A-3C are a series of plots illustrating a switching control scheme for the multi-mode energy router of FIG. 1 when it is operated in DC/DC buck mode, in accordance with an embodiment of the present disclosure.
Figure 3B:
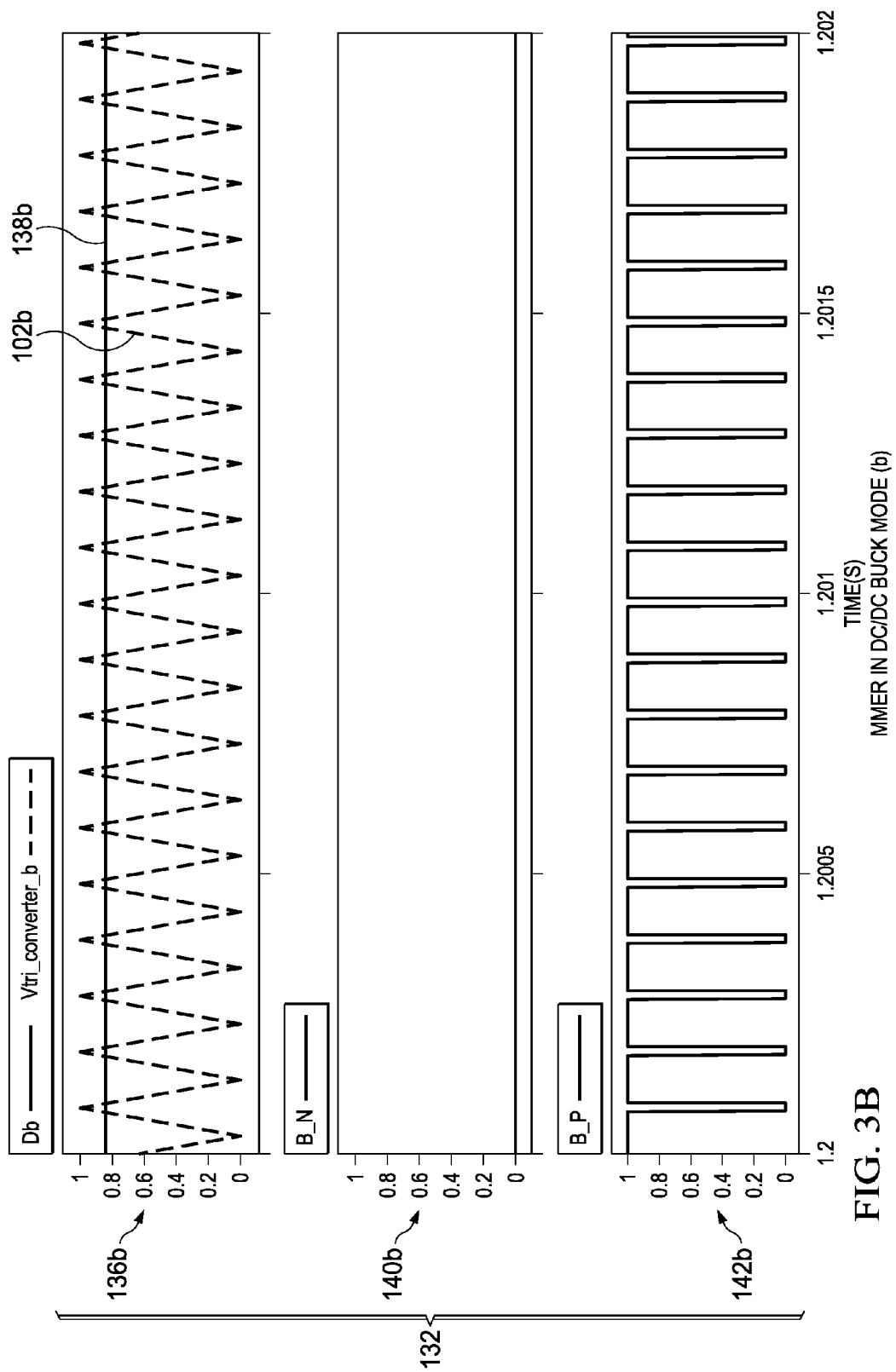
Figure 3C:
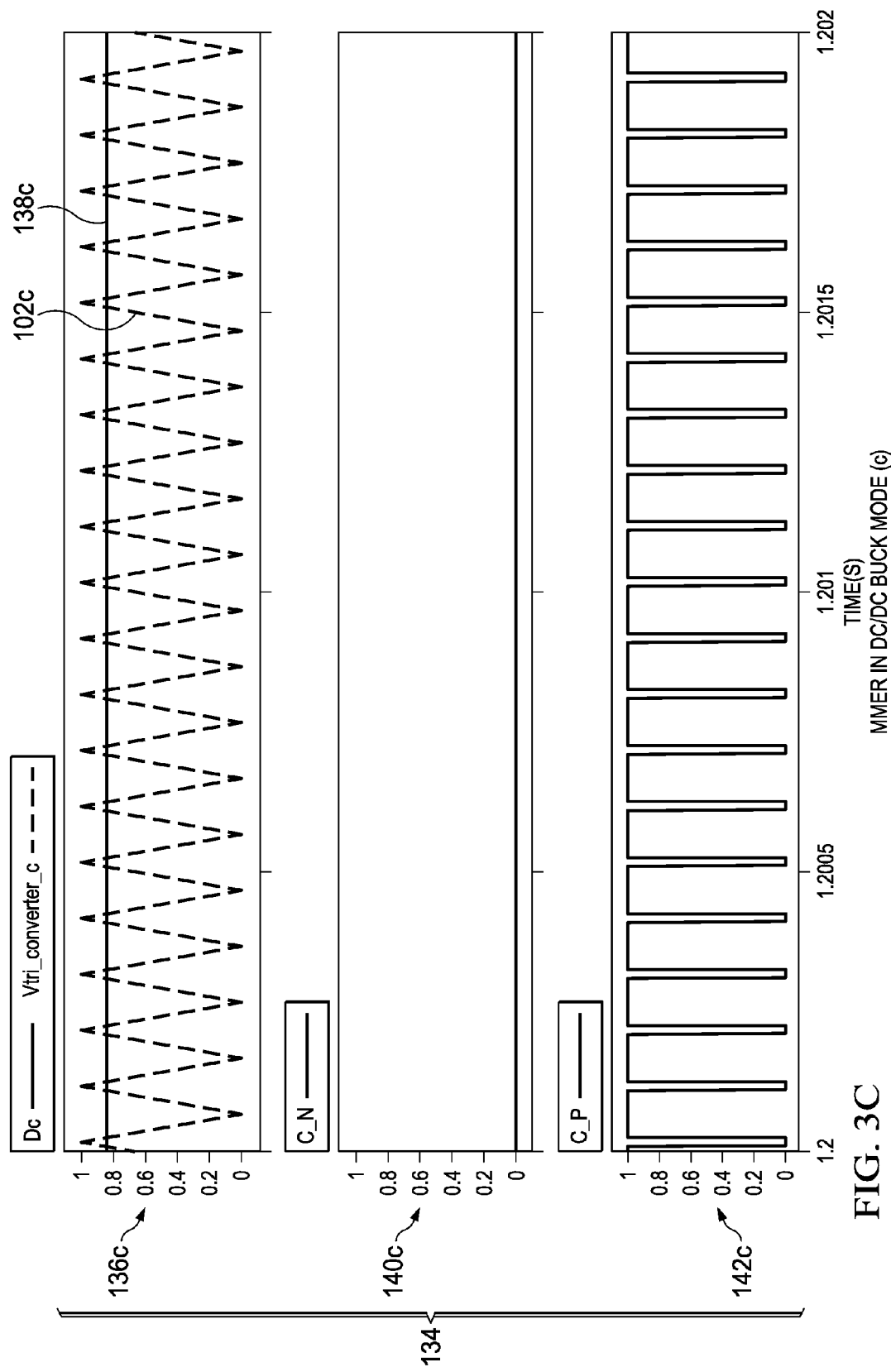

FIGS. 3A-3C show the gate signals of six IGBTs when the MMER is operated in a DC/DC buck mode. FIGS. 3A-3C include three series 130, 132, and 134 of plots representing the control scheme used in each of the three branches of the functional block 14 when operating in this mode. Each of these series 130, 132, and 134 of plots includes a plot 136 illustrating both a duty cycle 138 (Da, Db, and Dc) of the corresponding branch (or arm) along with the carrier signal 102 (10 kHz triangular waveform). The series 130, 132, and 134 each also include a plot 140 illustrating a gate signal (e.g., A_N, B_N, C_N) of the lower IGBTs Q2, Q4, and Q6 of FIG. 1. In addition, the series 130, 132, and 134 each include a plot 142 illustrating a gate signal (e.g., A_P, B_P, C_P) of the upper IGBTs Q1, Q3, and Q5.

As illustrated, the controller may operate the functional block of transistors in a DC/DC buck conversion mode according to the control logic provided below. In the below expression 2, the value Vtri represents the voltage value of the triangular waveform carrier signal 102 shown in the first plots 136a, 136b, and 136c of the series 130, 132, and 134 of FIGS. 3A-3C.

If Vtri_converter_a>Da, A_P=0, A_N=0;

If Vtri_converter_a<Da, A_P=1, A_N=0;

If Vtri_converter_b>Db, B_P=0, B_N=0;

If Vtri_converter_b<Db, B_P=1, B_N=0;

If Vtri_converter_c>Dc, C_P=0, C_N=0;

If Vtri_converter_c<Dc, C_P=1, C_N=0. (2)

Figure 4A:
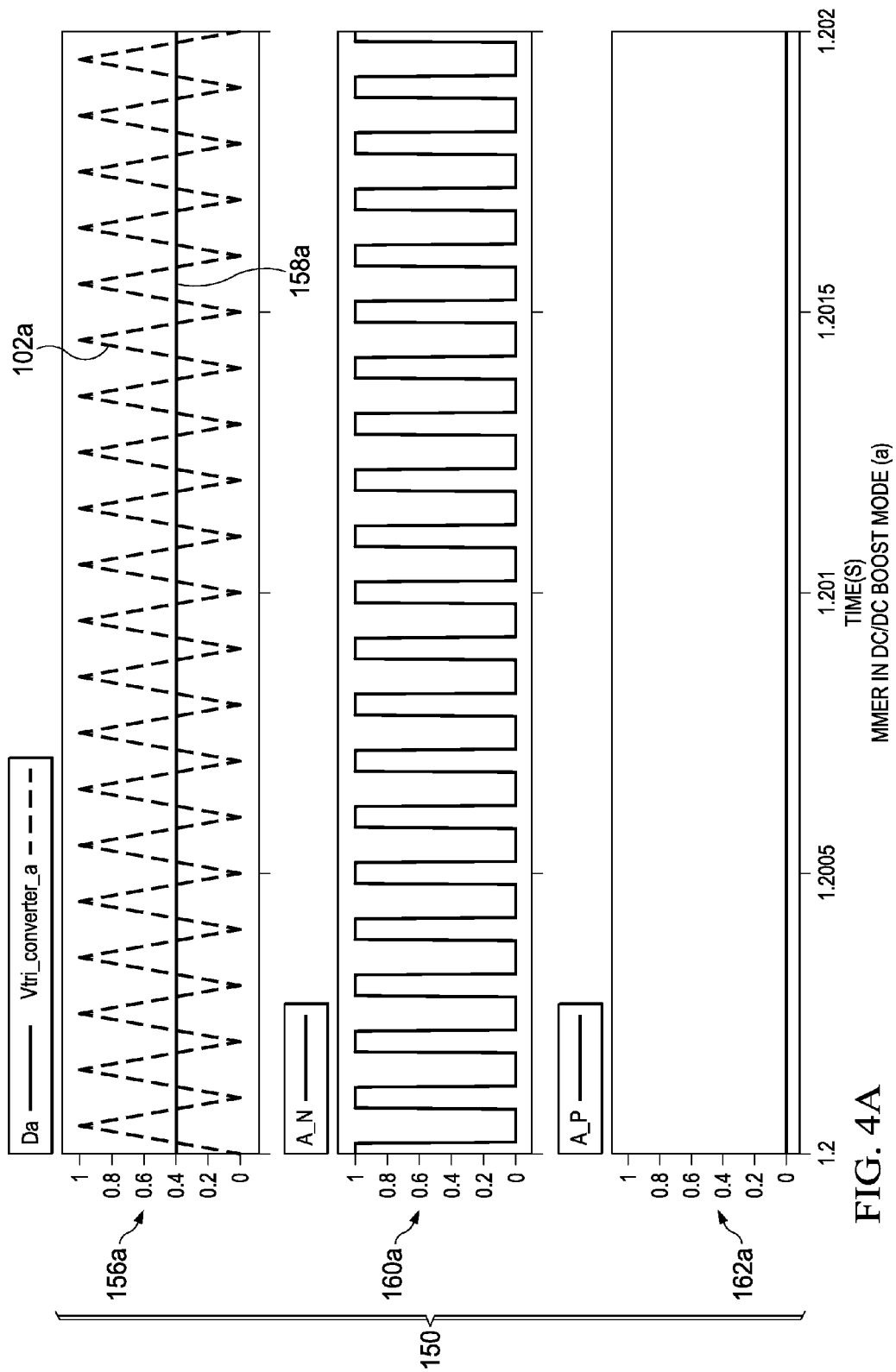
FIGS. 4A-4C are a series of plots illustrating a switching control scheme for the multi-mode energy router of FIG. 1 when it is operated in DC/DC boost mode, in accordance with an embodiment of the present disclosure.
Figure 4B:
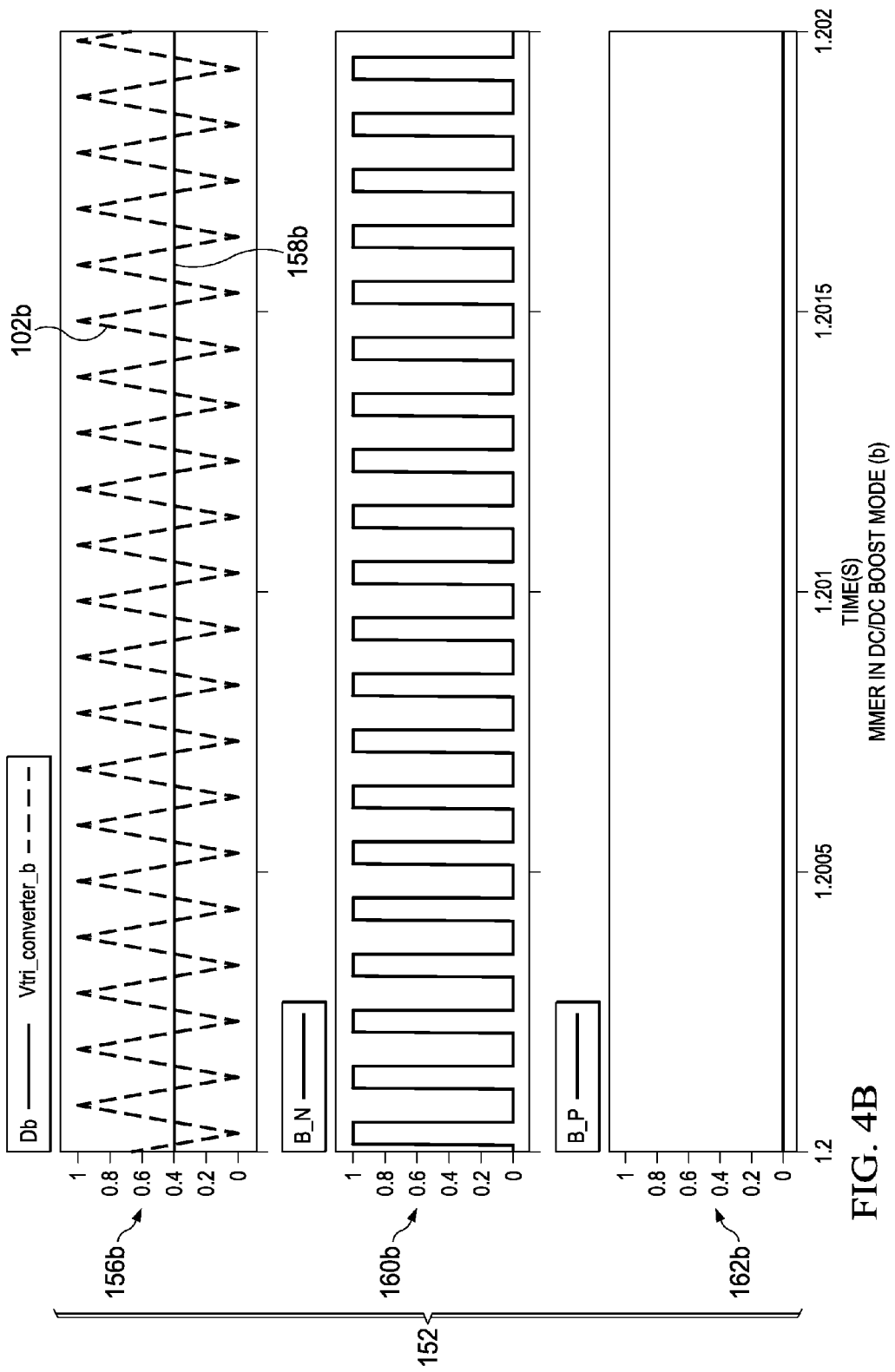
Figure 4C:
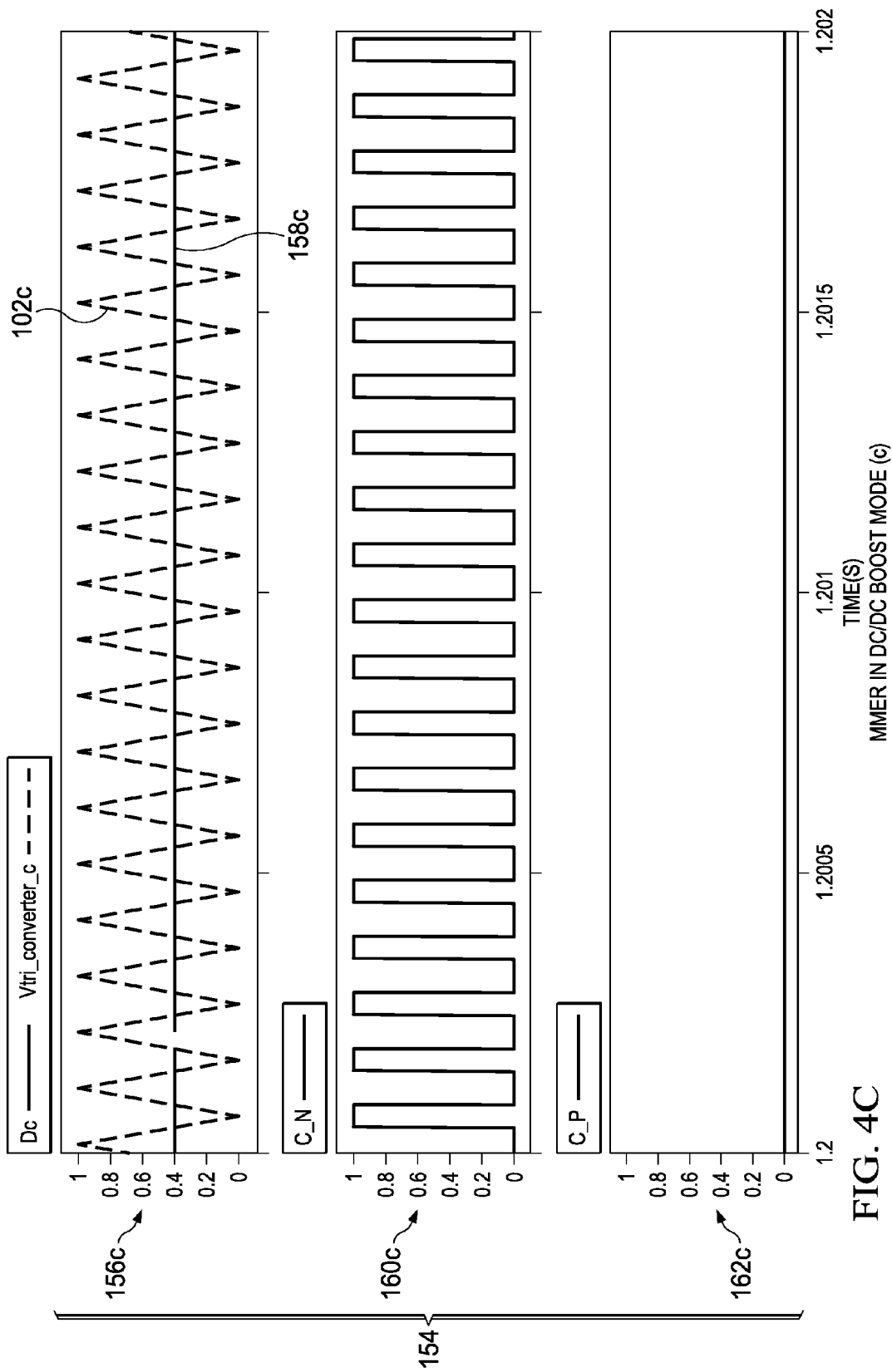

FIGS. 4A-4C show the gate signals of six IGBTs when the MMER is operated in a DC/DC boost mode. FIGS. 4A-4C include three series 150, 152, and 154 of plots representing the control scheme used in each of the three branches of the functional block 14 when operating in this mode. Each of these series 150, 152, and 154 of plots includes a plot 156 illustrating both the duty cycle 158 (Da, Db, and Dc) of the corresponding branch (or arm) along with the carrier signal 102 (10 kHz triangular waveform). The series 150, 152, and 154 each also include a plot 160 illustrating a gate signal (e.g., A_N, B_N, C_N) of the lower IGBTs Q2, Q4, and Q6 of FIG. 1. In addition, the series 150, 152, and 154 each include a plot 162 illustrating a gate signal (e.g., A_P, B_P, C_P) of the upper IGBTs Q1, Q3, and Q5.

As illustrated, the controller may operate the functional block of transistors in a DC/DC boost conversion mode according to the control logic provided below. In the below expression 3, the value Vtri represents the voltage value of the triangular waveform carrier signal 102 shown in the first plots 156a, 156b, and 156c of the series 150, 152, and 154 of FIGS. 4A-4C.

If Vtri_converter_a>Da, A_P=0, A_N=0;

If Vtri_converter_a<Da, A_P=0, A_N=1;

If Vtri_converter_b>Db, B_P=0, B_N=0;

If Vtri_converter_b<Db, B_P=0, B_N=1;

If Vtri_converter_c>Dc, C_P=0, C_N=0;

If Vtri_converter_c<Dc, C_P=0, C_N=1. (3)

Figure 5A:
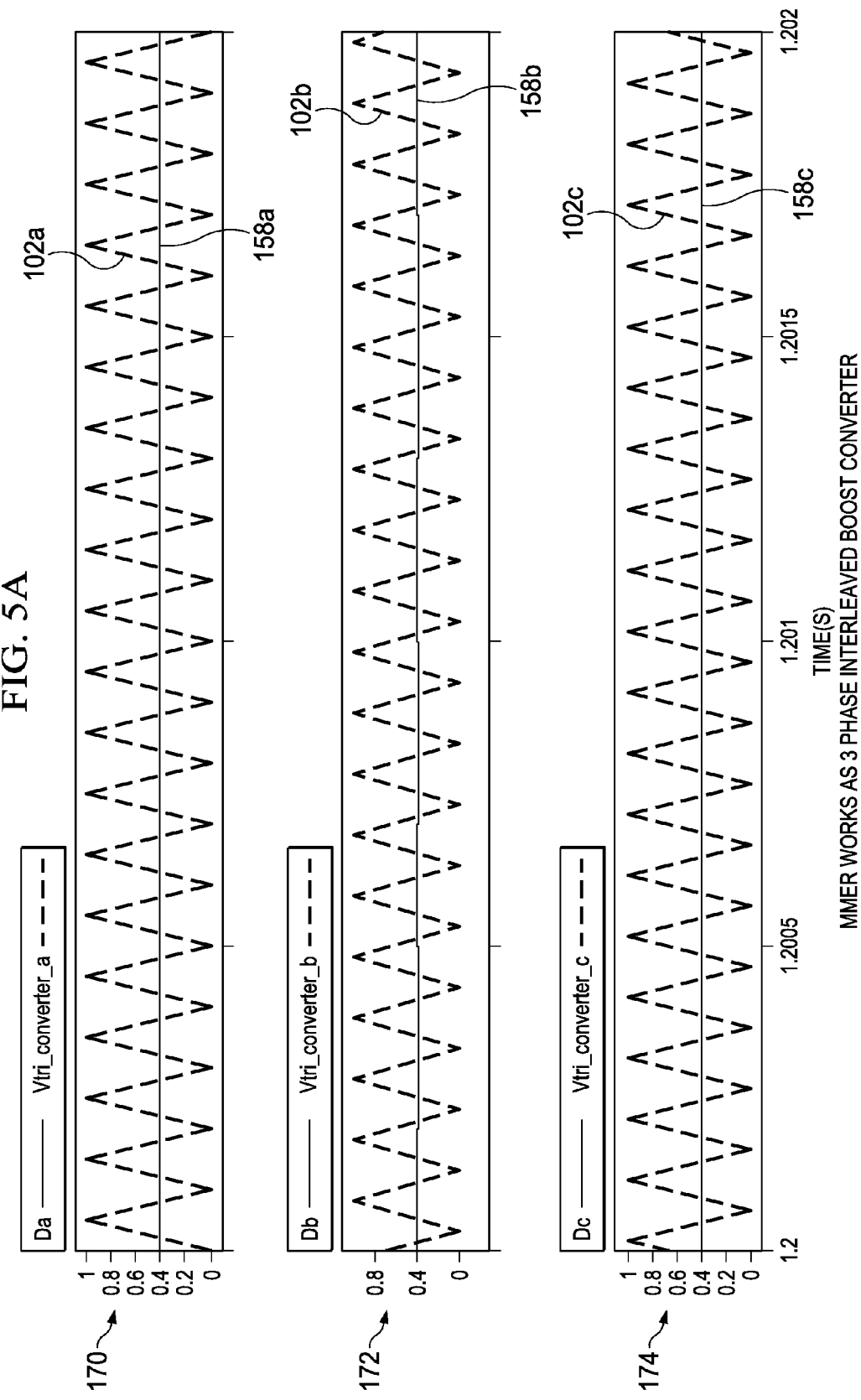
FIGS. 5A and 5B are a series of plots illustrating a control scheme for the multi-mode energy router of FIG. 1 when it is operated in a three-phase interleaved DC/DC boost mode, in accordance with an embodiment of the present disclosure.
Figure 5B:
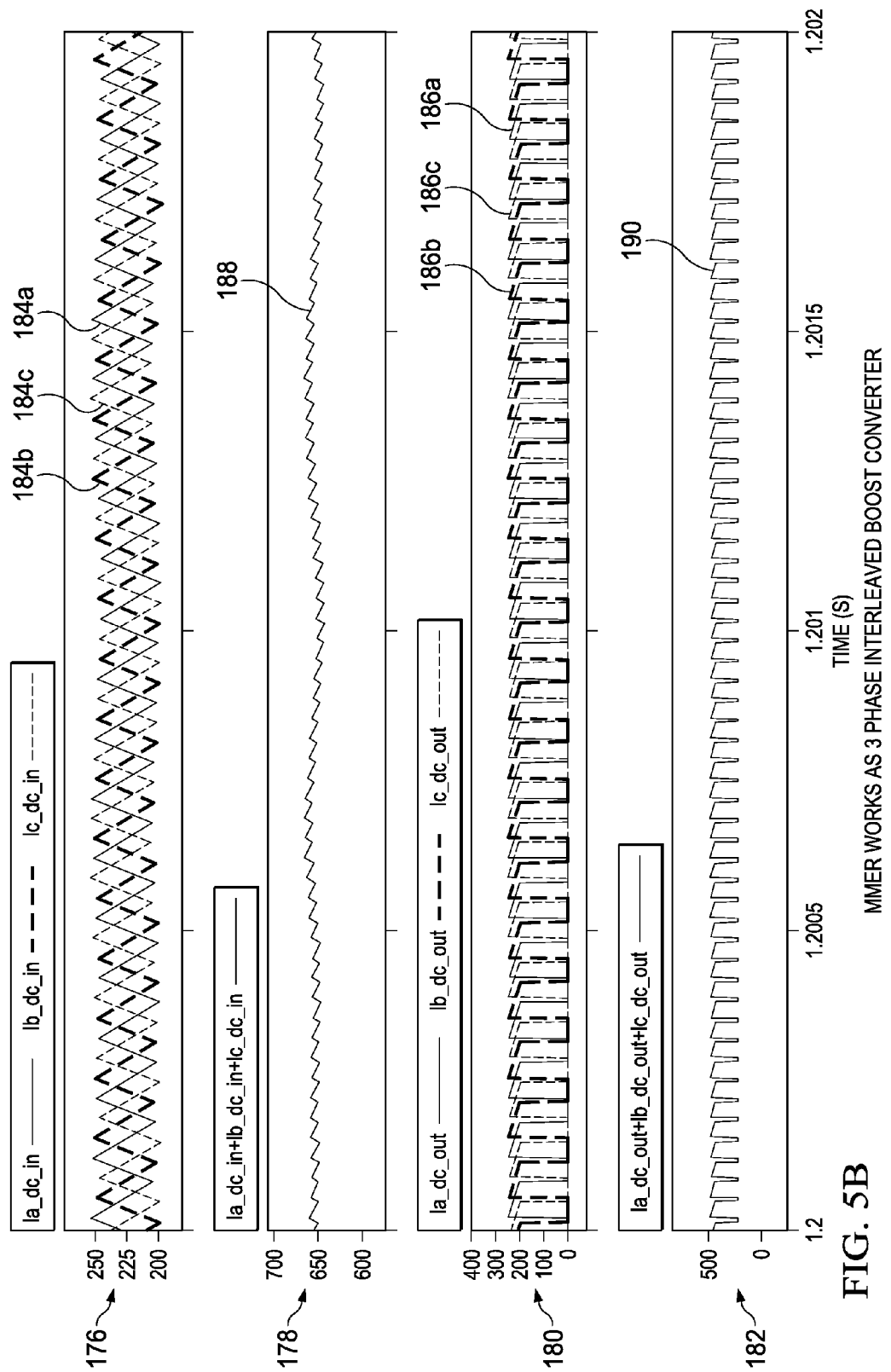

Since the three arms of the function block 14 of FIG. 1 can be controlled independently, the MMER may be controlled as a three-phase interleaved DC/DC converter to reduce input and output current ripple. FIGS. 5A and 5B show the input and output current of the MMER 12 when it is operated in a boost converter mode, although it could be similarly controlled to operate in a buck converter mode. FIGS. 5A and 5B include several plots 170, 172, 174, 176, 178, 180, and 182 to illustrate the interleaved control. The first three plots 170, 172, and 174 illustrate the duty cycle 158 (Da, Db, and Dc) of the corresponding branch (or arm) along with the carrier signal 102 (10 kHz triangular waveform). The fourth plot 176 illustrates input currents 184 (Ia_dc_in, Ib_dc_in, and Ic_dc_in) for each of the three branches, and these input currents 184 are also the inductor current of the three branches. Similarly, the sixth plot 180 illustrates output currents 186 (Ia_dc_out, Ib_dc_out, and Ic_dc_out) for each of the three branches, and these output currents 186 are also the diode current of the three branches.

As illustrated, the carrier signals 102 of the three arms have a 120 degrees phase shift (⅓ period) with respect to each other. Therefore, the input current ripple (plot 176) and output current ripple (plot 180) of each of the three arms also have a 120 degree phase shift with respect to each of the other arms. The fifth plot 178 illustrates the total input current 188, which is a sum of the input currents 184 in the three arms. The seventh plot 182 illustrates the total output current 190, which is a sum of the output currents 186 in the three arms. As illustrated, the total input current 188 and the total output current 190 have a smaller current ripple than would be available using a non-interleaved converter.

Turning back to FIG. 1, the disclosed MMER 12 may include one or more of the functional blocks 14 (UPFs) and a switch matrix (e.g., S1-S4) whereby power from specific sources or loads may be routed to the input or output of the functional block 14 under processor control. That is, the MMER 12 includes a switch matrix communicatively coupled to the controller 16 and used to switch the coupling of the functional block 14 between different sources and/or loads. The switch matrix may include several sets of electromechanical and/or semiconductor switches used to selectively couple the desired sources and loads to the functional block 14.

In the illustrated embodiment, for example, the switch matrix may include an AC switch 24 (S1) used to selectively couple an AC power source/load such as a power grid 26 (coupled to fuses 28) to a three phase side of the functional block 14. Another switch 32 (S2) may be controlled to selectively couple a DC power source/load 34 to the three phase side of the functional block 14. In addition, a DC switch 36 (S3) may be controlled to selectively couple the DC power source/load 34 to the DC side of the functional block 14. Furthermore, a DC switch 38 (S4) may be controlled to selectively couple another DC power source/load 40 to the DC side of the functional block 14.

In the illustrated configuration, the controller 16 may control the switches 24, 32, 36, and 38 to move them into open or closed positions, in order to facilitate a desired power conversion between the various sources/loads. More specifically, the controller 16 may control the switches 24, 32, 36, and 38 according to the control scheme outlined in Table 1 to connect the desired source/load components of the power conversion system 10 to the MMER 12. For example, when bi-directional power flow is desired between the grid 26 and B1 source/load 40, the controller 16 may close the S1 and S4 switches 24 and 38 and open the S2 and S3 switches 32 and 36. When bi-directional power flow is desired between the grid 26 and B2 source/load 34, the controller 16 may close the S1 and S3 switches 24 and 36 and open the S2 and S4 switches 32 and 38. When bi-directional power flow is desired between the B1 source/load 40 and the B2 source/load 34, the controller 16 may close the S2 and S4 switches 32 and 38 and open the S1 and S3 switches 24 and 36.

TABLE 1

Switch matrix control scheme

| | | |
|---|---|---|
| S1, S4<br>Grid ⟺ B1 | S1 & S4 closed,<br>S2 & S3 open | Allow bidirectional power flow between Grid and B1 |
| S1, S3<br>Grid ⟺ B2 | S1 & S3 closed,<br>S2 & S4 open | Allow bidirectional power flow between Grid and B2 |
| S2, S4<br>B1 ⟺ B2 | S2 & S4 closed,<br>S1 & S3 open | Allow bidirectional power flow between B1 and B2 |

The inductors 22 may perform different functions depending on the type of power conversion being performed by the MMER 12. When the functional block 14 is operating as an AC-DC power converter (e.g., inverter or rectifier), the inductors 22 may function as power conditioning AC-DC filters. When the functional block 14 is operating as a DC-DC power converter (e.g., buck or boost converter), the inductors 22 may function as energy storage elements. The inductors 22 may be selected so that they have an inductance within acceptable ranges for both the desired AC-DC and DC-DC power conversion modes, or different inductors may be switched into the circuit for AC-DC and DC-DC power conversion modes.

The controller 16 may control the transistors 18 of the functional block 14 and the switching matrix together to perform the desired power conversion between any number of loads and sources coupled to the MMER 12. For example, when it is desired to convert DC power from one of the DC power source/loads (e.g., B1 or B2) to the power grid 26, the controller 16 may close and open the appropriate switches to electrically couple the functional block 14 between the desired source/load and the grid 26. Simultaneously, or nearly simultaneously, the controller 16 may provide signals to operate the transistors 18 such that the DC power signal from the source is converted to AC power signals that are synchronized and displaced 120 degrees from each other. From here, the AC power signals are filtered and sent to the grid 26. An opposite process may be used to control the transistors 18 to convert three-phase AC power from the grid 26 to DC power provided to the appropriate source/load.

At other times, it may be desirable to convert DC power from one of the DC power source/loads to another DC power source/load. For example, in the illustrated embodiment, the B1 source/load 40 may represent a battery in an electric vehicle and the B2 source/load 34 may represent a stationary battery associated with the MMER 12. These source/loads 40 and 34 may operate at different voltages. The controller 16 may close and open the appropriate switches (e.g., S1 and S3 open, S2 and S4 closed) to electrically couple the functional block 14 between the two source/loads 40 and 34. Simultaneously, or nearly simultaneously, the controller 16 may provide signals to operate the transistors 18 at an interleaved carrier frequency to provide power from one DC source/load to the other.

The inductors 22 may function to provide an appropriate decrease or increase in voltage between the DC source/loads 40 and 34 to account for the difference in operating voltages of these components. When the controller 16 controls the transistors 18 to move the electrical current from the B1 source 40 (e.g., vehicle) to the B2 load 34 (e.g., stationary), the functional block 14 operates as a buck converter, since the inductors 22 effectively step the voltage down from a higher voltage to a lower voltage. When the controller 16 controls the transistors 18 to move the electrical current from the B2 source 34 (e.g., stationary) to the B1 load 40 (e.g., vehicle), the functional block 14 operates as a boost converter, since the inductors 22 effectively step the voltage up from the lower voltage to the higher voltage.

In the manner described above, the MMER 12 may include a single functional block 14 of power electronics that provides power conversion across a variety of bi-directional loads and sources that operate in the same or different modes. Traditionally, multi-mode power conversions between AC and DC sources/loads involve the use of two power conversion stages (one AC-DC conversion and then one DC-DC conversion). However, the presently disclosed power conversion system 10 may utilize a single converter (functional block 14) that is precisely controlled to facilitate power conversion between AC power (e.g., grid 26) and DC power (source/load 34 or source/load 40). In this way, the MMER 12 provides a more efficient method of converting power between sources and loads that operate in different modes.

Furthermore, the system architecture of the disclosed MMER 12 is highly flexible, being able to accommodate AC or DC sources or loads. The power conversion system 10 may be scalable, so that any desirable number, type, or operating mode of additional source/loads can be combined with the MMER 12. That is, instead of one connection to grid 26 and two connections to DC power source/loads, the illustrated MMER 12 may include switching components for selectively coupling a greater number of sources and loads to the functional block 14 used to provide the desired power conversion. These components may be relatively easy to accommodate by adding new switches and programming the controller 16 to control the switches and transistors as desired. The disclosed power conversion system 10 may enable implementation of complex power systems using relatively little hardware. This makes the system 10 lower cost compared to existing power conversion systems. In addition, as noted above, the MMER 12 may utilize a single conversion process to improve the power efficiency of the multi-mode conversion process.

In the illustrated MMER 12 of FIG. 1, all the inductors 22 are arranged asymmetrically (to the right side) with respect to the switching devices (main functional block 14). In some applications, this placement of the inductors 22 may be restricting. For example, when this inductor placement is used for DC/DC operations (buck or boost conversion), DC power that flows from right to left through the main functional block 14 and the inductors 22 (FIG. 1 of the Application Draft) will be boosted, while DC power that flows from left to right through this system will be reduced (buck conversion). The practical impact of this restriction is that the voltage of the source/load (e.g., B1) connected to the left side of the main functional block 14 and the inductors 22, in the specific conversion, must be greater than the voltage of the other source/load conversion (e.g., B2) connected to the right side of the main functional block 14 and inductors 22.

For some applications, this constraint of having a "higher voltage to left side" and a "lower voltage to right side" may not be a challenging restriction. For example, if the source/load 40 to the left is a vehicle battery and the source/load 34 to the right is a stationary battery, there may be sufficient freedom in specifying the voltages of the various batteries and grid connections at play within the system 10. Even where source/load voltages are more constrained, additional contractors may be added to switch the source/loads between the right and left sides of the functional block 14, depending on the voltage of the other source/load involved in specific conversions. An example of this is the contactor S3 (e.g., 36) in FIG. 1, which facilitates a connection between the B2 source/load 34 and the left (higher voltage) side of the main functional block 14. Thus, closing the S3 contactor 36 may connect the B2 source/load 34 to the higher voltage (left) side so that grid voltage is boosted up for charging the B2 load 34. With the S3 contactor 36 open and the S2 contactor 32 closed, the B2 source/load 34 may be connected to the lower voltage (right) side of the main functional block 14 so that its voltage can be boosted up to a higher B1 voltage for charging the B1 load 40 from the B2 source 34.

In other embodiments of the power conversion system 10, however, this voltage dependency of conversion may be undesirable, especially with source/loads that have wide variation in voltage. Photovoltaic systems are an example of such a source that may have a wider variation in voltage, although other source/loads could also have this performance. With a source/load having voltage that varies over a wide range, power conversion may have to be stopped so the source/load can be switched to the other side of the MMER 12. Such a discontinuity in power flow may be undesirable.

Figure 6:
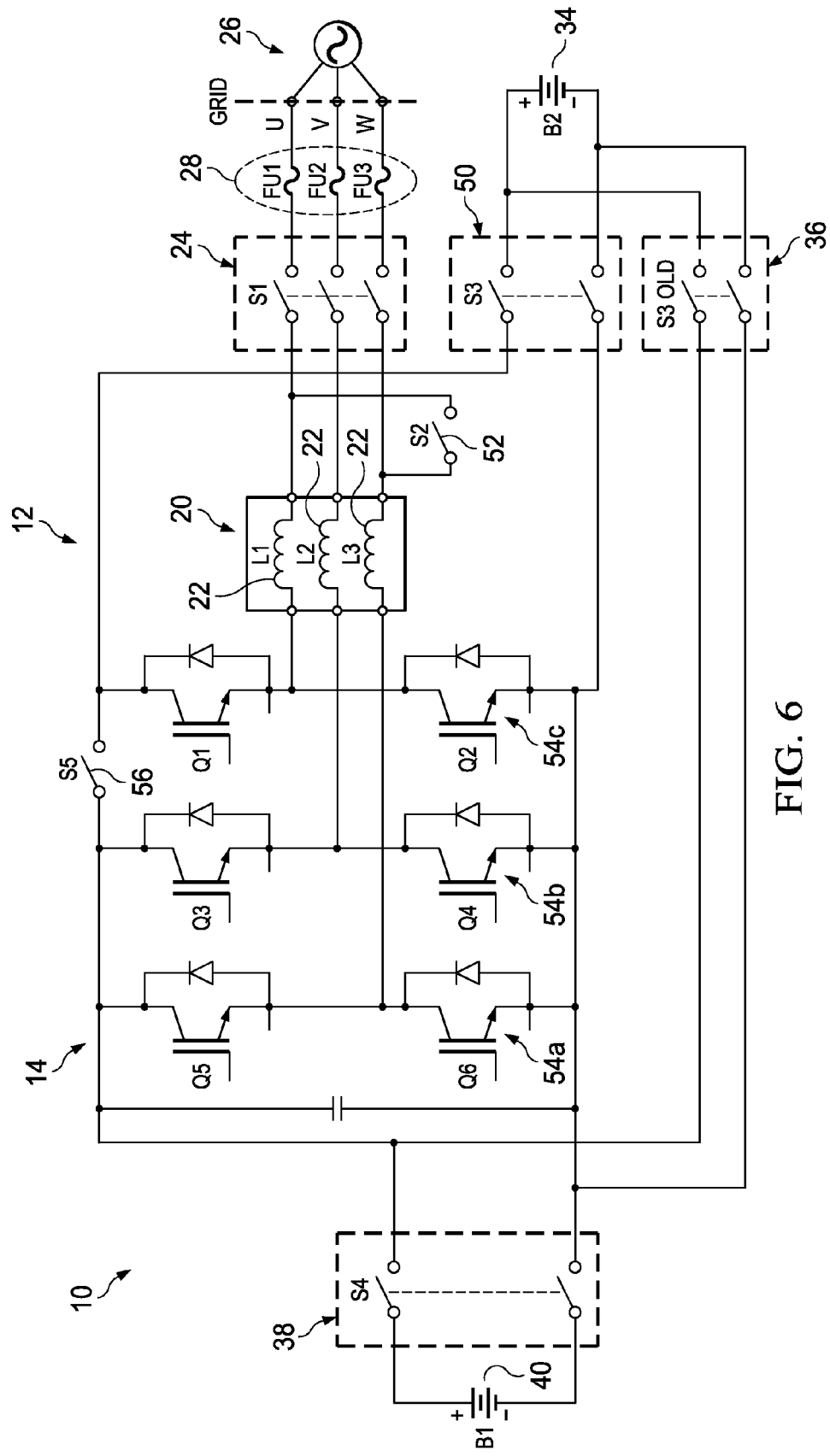
FIG. 6 is a schematic circuit diagram of a multi-mode energy router having symmetric energy storage inductors for DC conversions, in accordance with an embodiment of the present disclosure.

Certain embodiments of the MMER 12 may be designed with the energy storage inductors used for DC conversions connected symmetrically in the middle of two branches of the main functional block 14. This may be accomplished through different placement of contacts and switches within the MMER 12. FIG. 6 illustrates one example of an embodiment of the MMER 12 having the symmetric (for DC conversions) placement of the inductors 22.

As illustrated, the MMER 12 may include similar features as the MMER 12 shown in FIG. 1, but may feature a differently arranged switching matrix. For example, the illustrated MMER 12 may include a switch 50 (S3) that may be controlled to selectively couple the DC power source/load 34 to the three phase side of the functional block 14 using only two contacts. In addition, the DC switch 36 (S3_old) may be controlled to selectively couple the DC power source/load 34 to the DC side of the functional block 14. The DC switch 38 (S4) may be controlled to selectively couple the DC power source/load 40 to the DC side of the functional block 14. Further, the MMER 12 may include a switch/contact 52 (S2) disposed along a line between a first branch 54a of the functional block 14 and a third branch 54c of the functional block 14 to the right of the inductors 22. Still further, the MMER 12 may include another switch/contact 56 (S5) disposed between the second and third branches 54b and 54c of the functional block 14.

With the S2 switch 52 closed, an energy storage inductor for the DC/DC conversions may be implemented with two of the three inductor coils 22 of the three-phase inductor block 20. Since current is essentially complementary in the two coils, the three-phase inductor block 20 may have to be wound as three separate inductors 22 rather than as a three-phase inductor wound on a common core. The energy storage (DC) inductors 22 may thus be connected symmetrically between two of the three half bridge branches (e.g., 54a and 54c) of main functional block 14. The result of this symmetric converter is that wide range DC conversions may be accomplished in an essentially continuous manner. That is, the MMER 12 may be capable of transitioning from buck DC conversion to boost DC conversion using modulation control of the functional block 14 rather than by changing switches (S1-S5). This may enable power to flow either from higher to lower voltage (buck) or from lower to higher voltage (boost), no matter which side the higher or lower voltage source/load may be relative to the main functional block 14 at any time.

The S5 switch 56 may allow the third branch (54c) half-bridge of the main functional block 14 to form a separate connection to the functional block 14. That is, with the S5 switch 56 open and the S2, S3, and S4 switches 52, 50, and 38 closed, power from/to the B1 DC source/load 40 can enter/leave the main functional block 14 on the collector side of the upper switching device in the left most half-bridge branch 54a. In addition, power from/to the B2 source/load 34 can enter/leave the main functional block 14 at the collector side of the upper switching device in the right most half-bridge branch 54c. Although in the illustrated embodiment the far left and far right half-bridge branches 54a and 54c are used, any pair of the half-bridge branches (54, 54b, 54c) can be used. Also, as noted above, although the switches are illustrated as mechanical switches, they could be solid-state transistor based switches or other connection devices.

Figure 7:
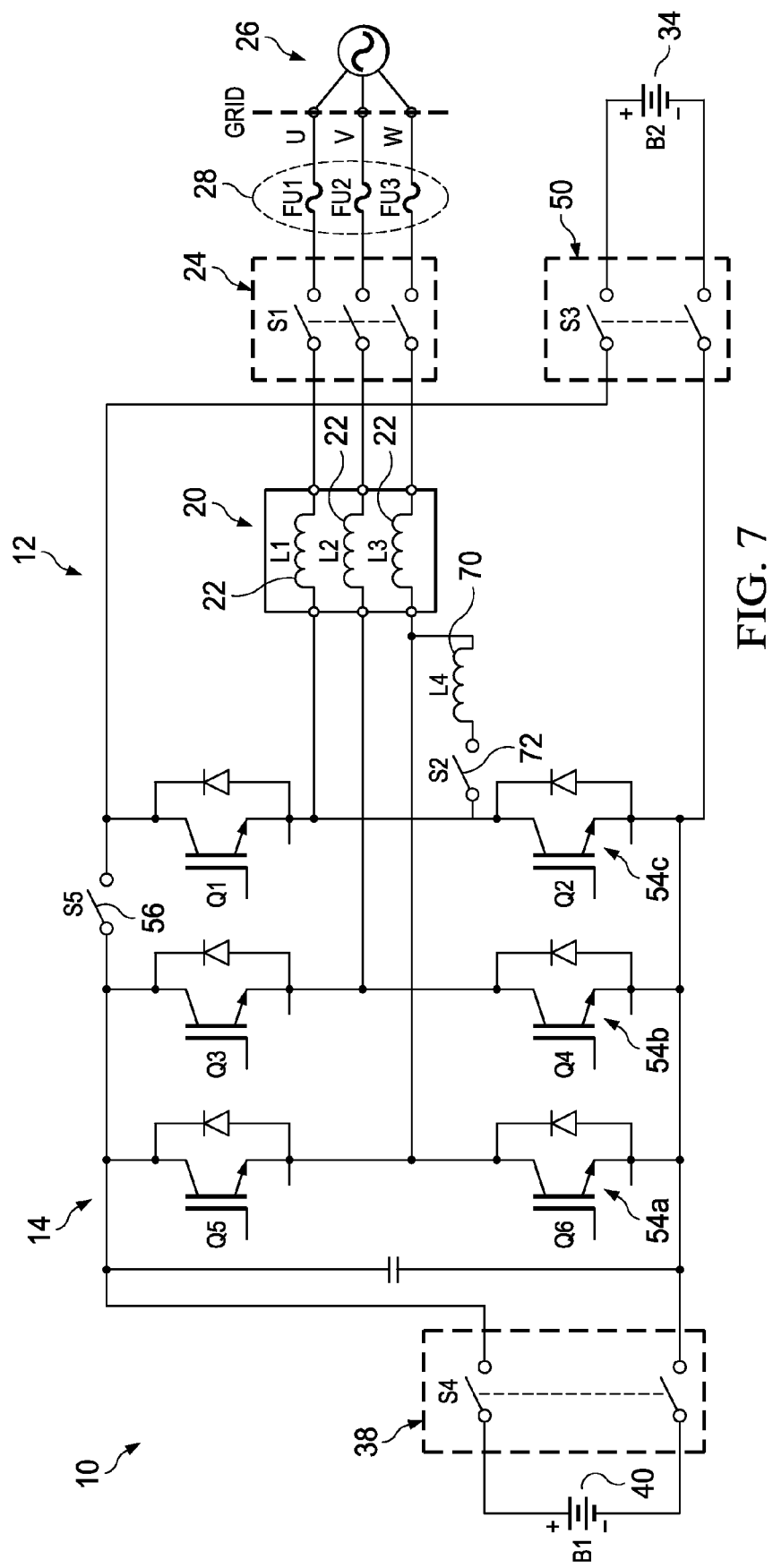
FIG. 7 is a schematic circuit diagram of a multi-mode energy router having a symmetric energy storage inductor for DC conversions, in accordance with an embodiment of the present disclosure.

FIG. 7 illustrates another embodiment of the MMER 12 having a symmetric energy storage inductor for DC/DC conversions. This embodiment is similar to the MMER 12 of FIG. 6, but instead features a separate inductor 70 (L4) for DC conversions, in addition to the inductor block 20 used to filter signals during AC conversions. This arrangement may be particularly desirable since it can be difficult to have a three-phase inductor that is capable of providing filtering for AC and without any DC bias also handling the energy storage and the DC bias used for DC conversion. FIG. 7 shows the separate DC inductor 70 (choke) connected between the symmetric first branch half-bridge 54a and the third branch half-bridge 54c. This connection may be implemented via a contact 72 (S2) on the left side of the inductor block 20. The contactor 36 (labeled S3_old in FIG. 6) and the additional path associated with it are not present in the illustrated embodiment. Thus, the symmetric DC conversion embodiment of FIG. 7 may include a version of the MMER 12 with a relatively simple circuit design.

While the MMER 12 illustrated in FIG. 7 is symmetric for DC/DC conversions, it is generally asymmetric for AC/DC conversions. Generally, this asymmetric design is not a restriction. However, the power transfer capabilities for the DC/DC conversion using the MMER 12 of FIG. 7 may be less than the power transfer capabilities for AC/DC conversions, since the illustrated MMER 12 uses only a single half-bridge branch to supply DC conversion power.

Figure 8:
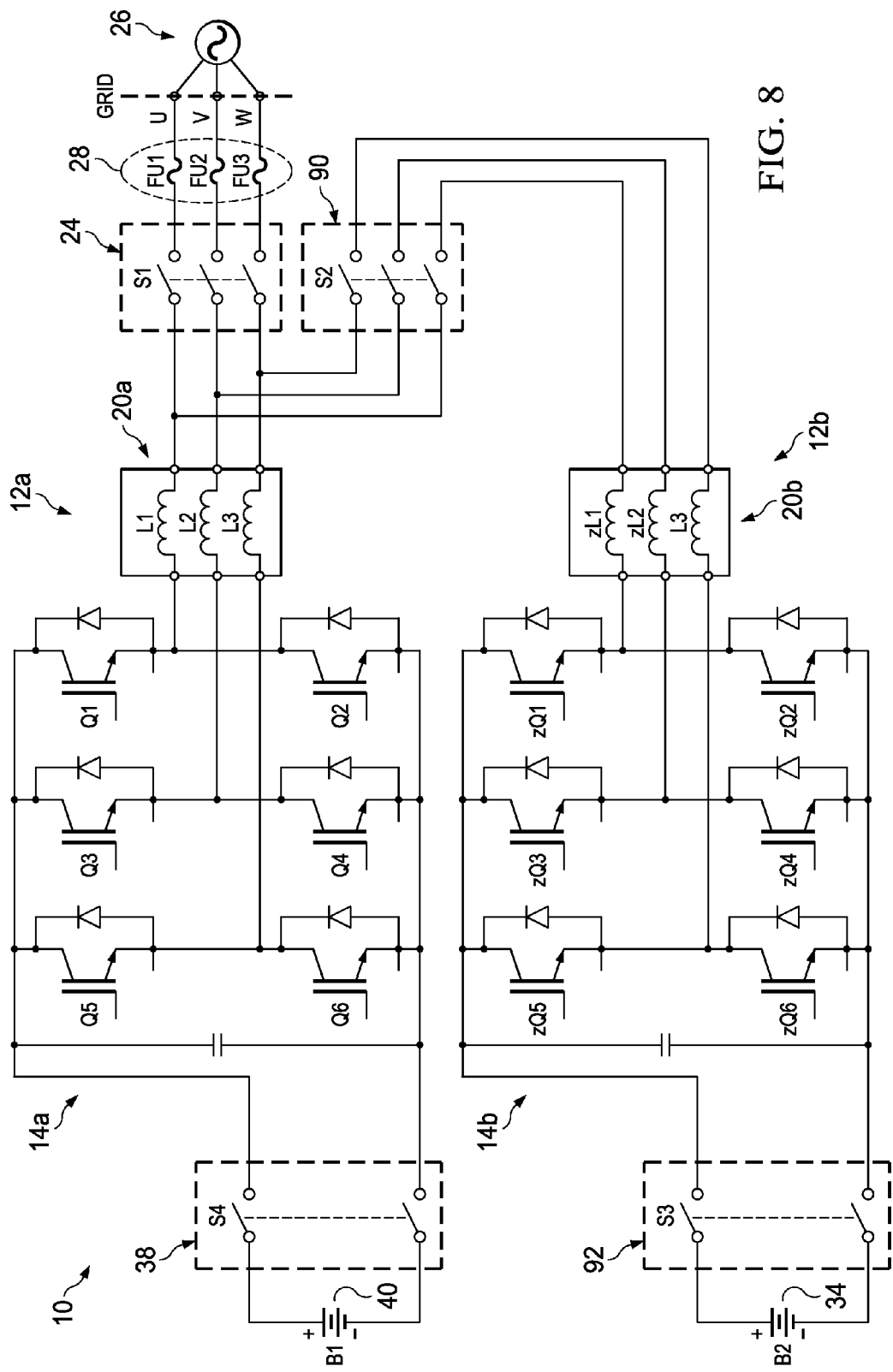
FIG. 8 is a schematic circuit diagram of a multi-mode energy router that is fully symmetric for DC conversions and three-phase AC transfers, in accordance with an embodiment of the present disclosure.

In some embodiments, it may be desirable to provide a power conversion system 10 that features a circuit that is fully symmetric for both DC/DC conversions and three-phase AC power transfers. FIG. 8 illustrates one example of such a power conversion system 10. The illustrated system effectively functions like two MMERs 12 coupled back-to-back (serially). In this embodiment, no additional DC inductors (chokes) are used. In FIG. 8, the MMERS 12a and 12b may include functional blocks 14a and 14b and inductor blocks 20a and 20b, respectively.

In the illustrated embodiment, the S1 switch 24 may be controlled to selectively couple the grid 26 (and corresponding fuses 28) to the three-phase side of the upper functional block 14a. In addition, the system 10 may include a switch 90 (S2) that may be controlled to selectively couple the grid 26 (and corresponding fuses 28) to the three-phase side of the lower functional block 14b. The system 10 may also include the S4 switch 38 that may be controlled to selectively couple the DC power source/load 40 to the DC side of the upper functional block 14a. Further, the system 10 may include a switch 92 (S3) that may be controlled to selectively couple the DC power source/load 34 to the DC side of the lower functional block 14b.

In this embodiment, the power transfer enabled by the two back-to-back functional blocks 14 (three-phase inverters), connected through the S2 switch 90, is AC power transfer. This AC power transfer may be used even for DC/DC conversions between the DC source/loads 34 and 40. Each main functional block 14 and inductor group 20 may be operating in three-phase synthesis (inversion) mode. Thus, the relative phase between the two inverters 14 may determine power flow. For example, whichever functional block 14 is operating with the leading phase angle delivers power, while the functional block with the lagging phase angle receives power. In embodiments where DC power is provided to the receiving load, this power flow may be cycle discontinuous, and so may be filtered, although this is not shown in FIG. 8. The illustrated system 10 may be used to transfer power from the B1 load/source 40 to the B2 load/source, or vice versa, regardless of which of these load/sources has the greater voltage, within the range allowed by the inductors 20a and 20b.

Power can be transferred from either DC source/load (e.g., 34 or 40) to the grid 26 by inversion mode or from the grid 26 to either or both of the DC source/loads 34 and 40 by active rectification mode. The grid 26 and either of the DC source/loads (e.g., 34, 40) may jointly deliver power to the other DC source/load (e.g., 40, 34). And, as noted above, additional DC source/loads may be connected to the DC side of either functional block 14 as is done with the S3 switch 92 or S4 switch 38. Also, additional AC source/loads (e.g., grid 26) can be added with contractors similar to the S1 switch 24.

Figure 9:
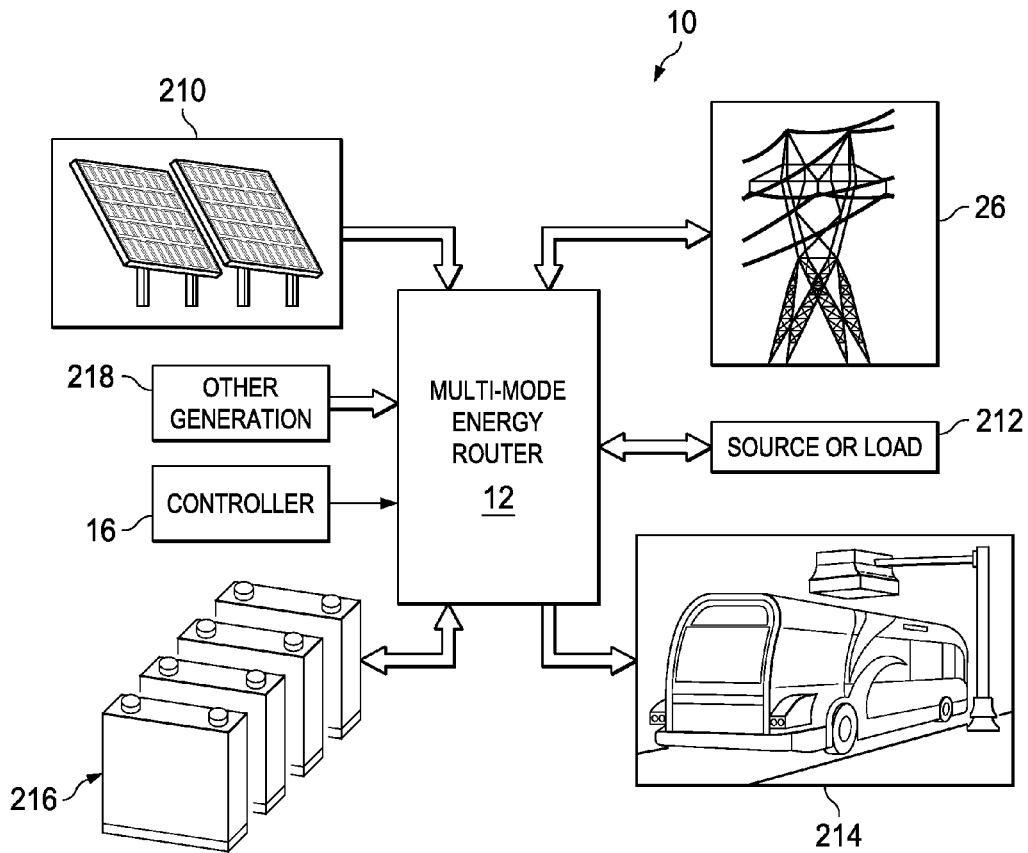
FIG. 9 is a schematic representation of several applications that may be combined via the multi-mode energy router of FIG. 1, in accordance with an embodiment of the present disclosure.

FIG. 9 illustrates an embodiment of a power conversion system 10 that may utilize the MMER 12 to connect multiple different sources or loads. In the illustrated embodiment, for example, the MMER 12 is coupled to a photovoltaic (PV) cell power source 210, the power grid 26, another source or load 212, an electric bus 214, a stationary battery 216, and another power generation source 218. Some of these components (e.g., PV cell power source 210 and power generation source 218) may be configured to only act as a power source, while other components (e.g., electric bus 214) may function only as a load requiring power. Still other components (e.g., grid 26, source or load 212, and battery 216) may be operable as either a power source or a load, depending on the power needs at the time. These components may operate in different electrical modes, such as three phase AC power for the grid 26 and DC power for the battery 216.

As described above, the MMER 12 may include a single power conversion functional block designed to perform the desired power conversion between any two of the attached components. Thus, the MMER 12 provides a bi-directional and multi-mode power connection between the multiple components coupled thereto. The components may be attached to the functional block via the switching matrix described above in relation to any of FIG. 1, 6, 7, or 8. The controller 16 may control the switching matrix and the functional block of the MMER 12 to selectively couple the desired components to the functional block and to facilitate the desired power conversion between the components.

The controller 16 may change the power conversion process being performed throughout the lifetime of the MMER 12. For example, the MMER 12 may convert energy from the grid 26 to the electric bus 214, and then change to converting energy from the PV cell source 210 to the grid 26. The power conversion being performed by the MMER 12 may be controlled based on user preference. In some embodiments, the controller 16 may change the power conversion being performed by the MMER 12 based on timing (e.g., using the PV cells 210 to power the electric bus 214 during the day and using the battery 216 to power the electric bus 214 at night). In other embodiments, the controller 16 may change the power conversion operation based on availability of electrical power from the various sources (e.g., converting energy from the grid 26 to recharge a battery 216 that has run low). In still other embodiments, the controller 16 may change the power conversion process based on a user prescribed order of source components to be depleted or load components to be powered.

The single MMER 12 described above with reference to FIG. 1, 6, 7, or 8 can be used as a building block of larger power conversion systems, especially where mixed-mode conversions are performed using several source/loads. An example of this, as described with reference to the electric bus application of FIG. 9, may involve supplying power from the grid 26 simultaneously with power from photovoltaic panels 210 or power from a stationary battery 216 and delivering this power to the battery of the electric bus 214. Other variations and combinations of source/loads may be utilized in other embodiments. Such complex power flow situations could easily occur in practice.

As discussed at length above, the basic MMER 12 may allow power flow from a single source to a single load at any one time and, thus, may not be able to fully handle multiple power sources contributing power in a conversion or multiple loads receiving power in a conversion. To address these more complex situations, additional branches (pairs of switching transistors 18 of FIG. 1) in the main functional block 14 and more switches or contractors could be added to the power conversion system 10. However, instead of using a more complex MMER, other systems 10 may be designed that utilize the basic MMER 12 as a building block that is reproduced in its general form as a convenient way to build complex power conversion systems.

Two or more MMERs 12 may be controlled to facilitate full power conversion between three different power source/loads. The controller 16 may carefully control the individual transistors 18 so that each MMER 12 can convert power from multiple sources to a single load, or convert power from the same source to multiple loads. Examples of this would include power conversions from both the grid 26 and the B2 source 34 delivered to the B1 load 40, or power conversions from the grid 26 to both the B1 load 40 and the B2 load 34.

Figure 10B:
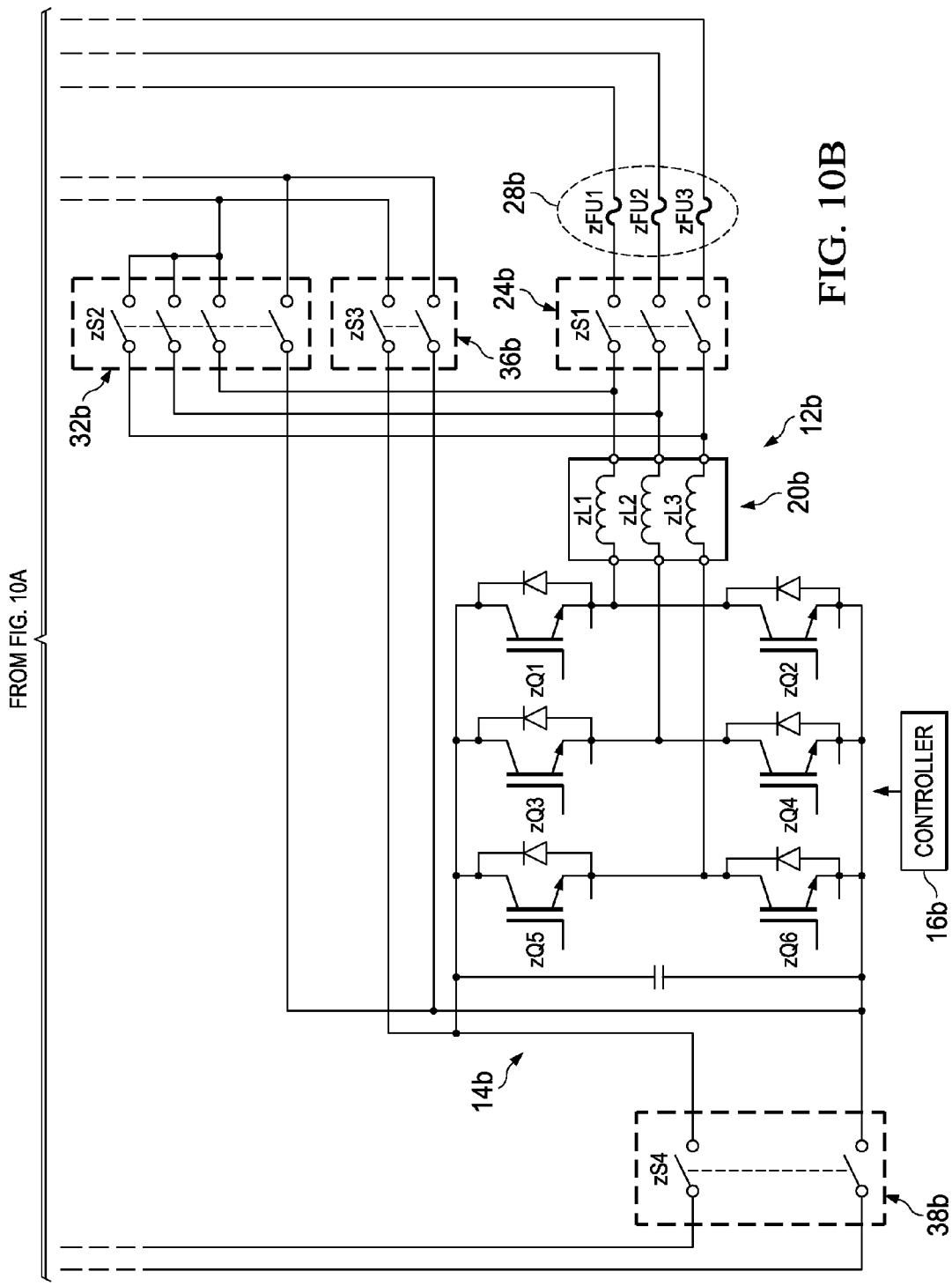

FIGS. 10A and 10B illustrate an example of a power conversion system 10 using two MMERs 12a and 12b. In certain embodiments, the power conversion system 10 may be an electric vehicle charging station, as described above with reference to FIG. 9. The B1 source/load 40 may include a battery that is connected to both of the MMERs 12 and is considered to be in an electric bus or other vehicle. As such, the B1 source/load 40 may be mobile so that it can be selectively connected to or disconnected from the MMER system. The B2 source/load may include a stationary battery that is always connected to both of the two MMERs 12. The mobile and stationary aspects of these source/loads 34 and 40 are for example only and are not requirements for a multiple MMER system as illustrated in FIGS. 10A and 10B. Other sources of power and/or loads can be included as well in the system 10, and the system 10 can include more than two MMERs 12.

The illustrated two MMER system is connected to a three-phase AC power source/load (e.g., grid 26). The system of MMERs 12 may be designed to maintain the time averaged power taken from the grid 26 as nearly constant as possible while the power provided to the vehicle battery (B1 source/load 40) varies greatly. This may be a particularly desirable constraint for large power sources or loads that are connected to the electricity grid 26, as it may aid in the stability of the grid 26.

Figure 11A:
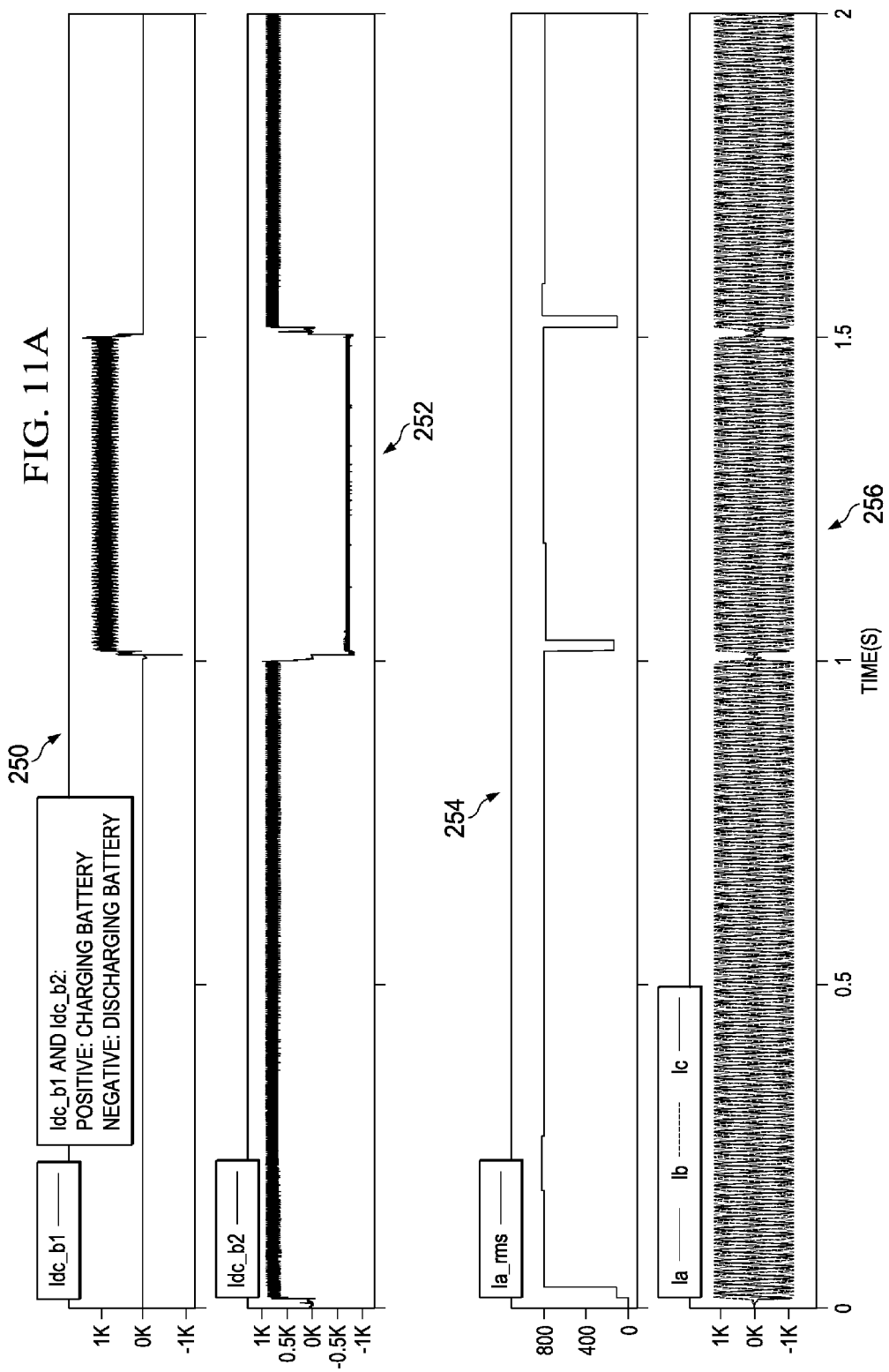
FIGS. 11A and 11B are a series of plots illustrating current flowing through components of the power conversion system of FIGS. 10A and 10B, in accordance with an embodiment of the present disclosure.
Figure 11B:
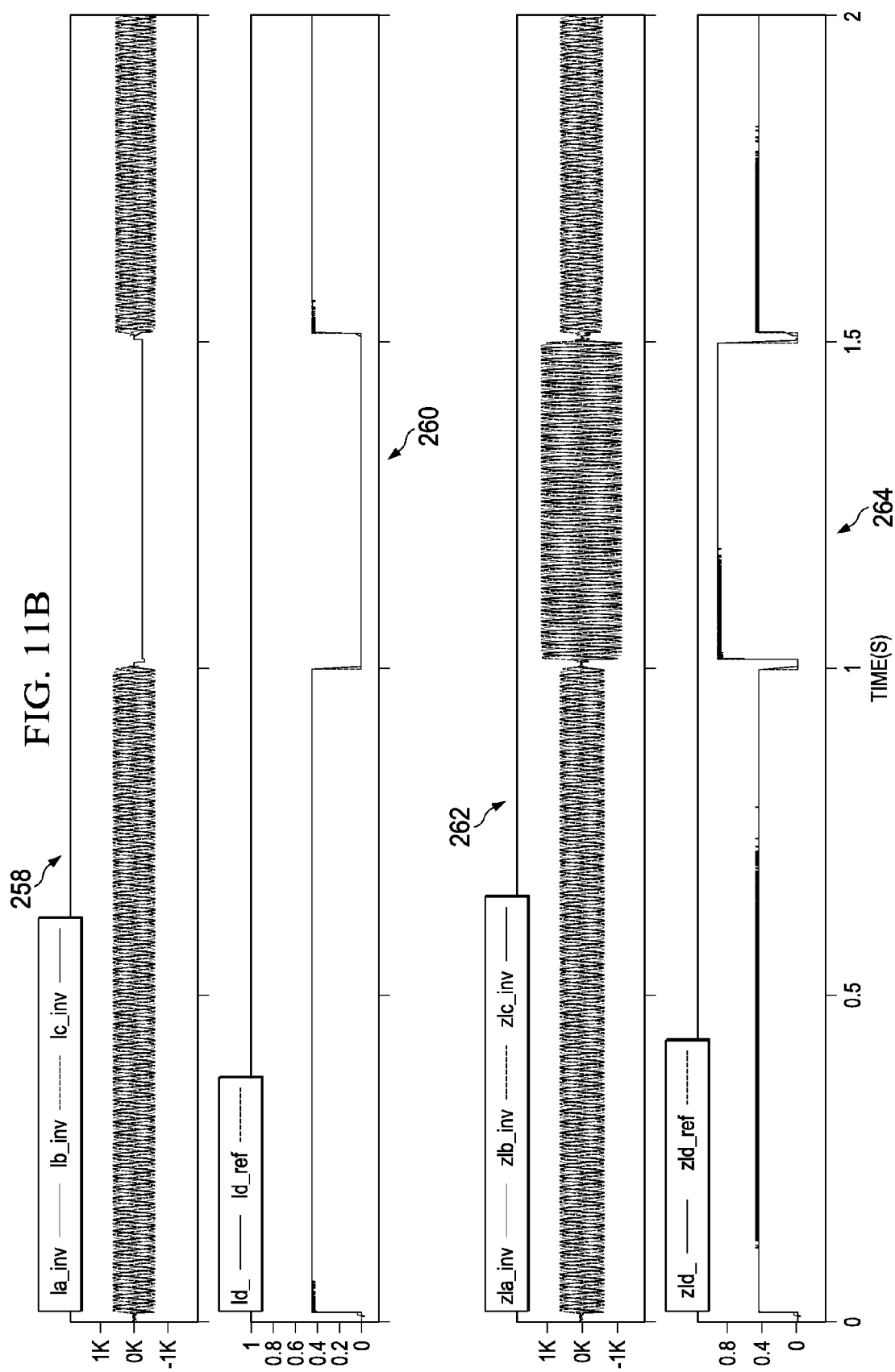

Having generally described the layout of the two MMER power conversion system 10, a more detailed description of the operation of the system 10 will be provided. Such operation of the system 10 may begin when the B1 source/load 40 is connected to the MMERs 12 and is being charged. One MMER (e.g., the upper MMER 12a) may include connections made to the B1 source/load 40 and the B2 source/load 34 (S2 and S4 switches 32a and 38a closed), and the MMER 12a may operate under the control mode as a DC/DC boost converter, as controlled by controller 16a. Power may flow from the B2 source 34 and be delivered to the B1 load 40. The other MMER (e.g., the lower MMER 12b) may include connections made to the grid 26 and to the B1 source/load (zS1 and zS4 switches 24b and 38b closed), and the MMER 12b may operate under the control mode as a three phase rectifier taking power from the grid 26 and delivering the power to the B1 load 40. The grid power level delivered by the lower MMER 12b may be controlled independently (via controller 16b) from the power coming from the B2 source 34 to the B1 load 40 through the upper MMER 12a. The sum of the power levels supplied to the B1 load 40 may charge the battery B1. This is shown in FIGS. 11A and 11B during the 1.0 to 1.5 time interval.

The level of power into the B1 load 40 may decrease as the B1 battery becomes charged. Although not shown in the waveforms of FIGS. 11A and 11B, the decrease in battery B1 power may initially be provided by a decrease in power from the B2 source 34 converted via the upper MMER 12a. This decrease may be relied on until the power provided to the B1 load 40 equals the grid power converted through the lower MMER 12b. At this point, the power out of the B2 source/load 34 through the upper MMER 12a may be zero while the B1 battery charging power is fully provided by the grid 26 through the lower MMER 12b.

The illustrated system 10 may be controlled to further reduce the B1 battery charging power without reducing grid power from the grid 26. This may be accomplished in several different ways. For example, the controller 16a may control the switches of the upper MMER 12a to connect the upper MMER 12 to the grid 26 and to the B2 source load 34 (open S2 and S4, then close S1 and S3) and operate under the control mode as a three-phase rectifier, similar to the lower MMER 12b. The upper MMER 12a may then deliver power from the grid 26 to the B2 load 34. The amount of power supplied to the B2 load 34 by the upper MMER 12a may increase directly as the power supplied to the B1 load 40 by the lower MMER 12b is further reduced. The sum of the powers of the two MMERs 12a and 12b, both supplied from the grid 26, may be controlled to equal the desired constant power from the grid 26.

Once the B1 load 40 is disconnected from the two MMER system, each of the MMERs 12a and 12b may be adjusted to delivered equal parts (half) the power supplied from the grid 26 to the B2 load 34. This may result in equal heating within the MMERs 12a and 12b. This final operating condition of the system 10 is shown in FIGS. 11A and 11B as waveforms during the 0.0 to 1.0 and 1.5 to 2.0 intervals.

FIGS. 11A and 11B illustrate several plots 250, 252, 254, 256, 258, 260, 262, and 264 showing waveforms that represent two of the control modes explained above with reference to the two MMER power conversion system 10 of FIG. 10. These control modes may include the "start" mode from the 1.0 to 1.5 time interval and the "finish" mode from the 0-1.0 and 1.5-2.0 time intervals. It should be noted that there are discontinuities illustrated near the times 1.0 and 1.5 in the waveforms of FIGS. 11A and 11B, but these are merely a result of simplifications in the simulation model and do not necessarily reflect actual system performance.

There are eight waveforms shown in FIGS. 11A and 11B. The first waveform 250 may represent the current of the B1 source/load 40. Positive current flows into the B1 source/load 40 (charging), and negative current flows out of the B1 source/load 40 (discharging). The second waveform 252 may represent the current of the B2 source/load 34. Similar to the first waveform 250, positive current flows into the B2 source/load 34 (charging) while negative current flows out of the B2 source/load 34 (discharging). The third waveform 254 may represent the Root Mean Square (RMS) grid current. The fourth waveform 256 may represent the instantaneous three phase grid current available from the grid 26.

The fifth waveform 258 may represent an instantaneous current through the upper MMER 12a. It should be noted that, during the 1.0 to 1.5 interval, the current through the upper MMER 12a is DC and therefore is equal in the three branches of the main functional block 14a of the MMER 12a. Thus, the total current contributed by the upper MMER 12a to the B1 source/load 40 may be three times the current shown in the plot 258. The sixth waveform 260 may represent a current control reference (and current feedback) for the upper MMER 12a. The seventh waveform 262 may represent the 3-phase instantaneous current through the lower MMER 12b. The eighth waveform 264 may represent a current control reference (and current feedback) for the lower MMER 12b.

In the simulation illustrated in FIGS. 11A and 11B, from 0 second to 1 second both of the MMERs 12a and 12b are generally operated as rectifiers converting incoming AC power from the grid 26 to charge the B2 source/load 34. During this period of time, the current control references for each MMER 12 may be the same (e.g., 0.45) and at half of the level (0.90) of the current control of the lower MMER 12b during the interval of 1.0 to 1.5 seconds. They may be equal so that power dissipation (i.e. heating) in the two MMERs 12a and 12b are equal and at the half level so the AC grid current RMS value remains constant. The current feedback of both the MMERs 12*a* and 12*b* may follow the respective current control reference, as shown.

In the illustrated simulation, from 1 second to 1.5 second the upper MMER 12*a* generally operates as a boost converter, charging the B1 source/load 40 with power from the B2 source/load 34. During this period of time, the AC current control reference of the upper MMER 12*a* may be disabled (set to 0) because the upper MMER 12*a* is operated in a DC/DC boost converter mode. During this interval, the lower MMER 12*b* may continue to operate as a rectifier, taking power from the grid 26 and providing it to the B1 source/load 40 instead of the B2 source/load 34. The current control reference for the lower MMER 12*b* may go to the AC grid RMS current level (e.g., 0.90) since it is the only MMER 12 taking power from the grid 26 during this time.

Figure 12:
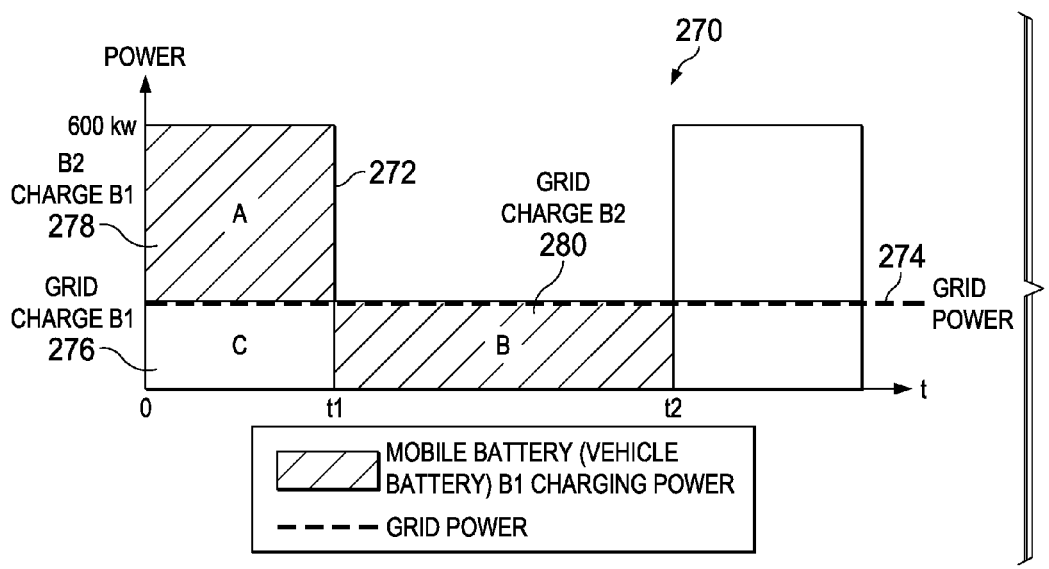
FIG. 12 is a plot illustrating a distribution of power between the grid and certain load/source components, in accordance with an embodiment of the present disclosure.

When operating the power conversion system 10 of FIGS. 10A and 10B, the power of the grid 26 may be carefully controlled so that the power conversion system 10 can adapt to various scenarios. FIG. 12 illustrates a certain scenario in which the grid power conversion may be controlled. In the illustrated plot 270, a square waveform 272 may represent the charging power of the B1 source/load 40 (e.g., mobile battery) and a horizontal straight line 274 may represent the power supplied by the grid 26. If the power conversion system 10 (e.g., charging station) only relies on grid power to charge the B1 source/load 40, and the B2 source/load (e.g., stationary battery) is not used, the grid power may be exactly the same as the B1 charging power. The grid power used in this instance may have a high peak to average ratio, which may impose a burden on the electricity generation. Typically, industrial electricity customers with this sort of load can be financially penalized by the electric company with "demand charges." In order to avoid these charges by maintaining a more constant level of grid supplied power, the stationary battery B2 source/load 34 may be added to the system 10.

As illustrated from the time 0 to t1 seconds, the stationary battery B2 source/load 34 and the power grid 26 may charge the mobile battery B1 source/load 40 together. The amount of electric energy flowing from grid 26 to the B1 source/load 40 may equal the area of 'C' 276 in the plot 270, and the amount of electric energy provided by the B2 source/load 34 to charge the B1 source/load 40 may equal the area of 'A' 278 in the plot 270. From t1 to t2 seconds, the mobile battery B1 source/load 40 may leave the charging station, such that the power grid 26 charges only the stationary battery B2 source/load 34. The amount of electric energy that flows from the grid 26 to the B2 source/load 34 at this point may equal the area of 'B' 280.

To keep a balance of charge in stationary battery (B2), the area of 'A' 278 may be controlled to approximately equal the area of 'B' 280. It should be noted that these approximately equal areas in the plot 270 may be controlled neglecting certain battery losses (e.g., storage inefficiency, self-discharge, and aging) of the source/loads. If the area of 'A' 278 is smaller than the area of 'B' 280, the energy that the B2 source/load 34 received from grid may be greater than the energy that the B2 source/load 34 provided to the B1 source/load 40. That may result in an increase of the long term State of Charge (SOC) in the B2 source/load 34. If the area of 'A' 278 is larger than the area of 'B' 280, the energy that the B2 source/load 34 received from the grid 26 may be less than the energy that the B2 source/load 34 provided to the B1 source/load. This may result in a decrease of the long term SOC in the B2 source/load 34. The area of 'B' 280 may be calculated as the product of average grid power and the time duration (t2–t1). The time interval (t2–t1) may represent the time when the vehicle (e.g., B1) is not being charged.

A control algorithm may be utilized to control the average grid power supplied to either source/load so that the area of 'B' 280 can be maintained equal to the area of 'A' 278. Using this control algorithm, the power conversion system 10 may adjust the average grid power used based on power provided to charge the B1 source/load 40 (e.g., buses) and the time between charging of the B1 source/load 40. Also, because of battery aging, the energy storage capability of the B2 source/load 34 (e.g., stationary battery) may decrease over time. Thus, the control algorithm may be adapted for various battery conditions of aging, self-discharge, and internal losses.

Although the present disclosure and its advantages have been described in detail, it should be understood that various changes, substitutions and alterations can be made herein without departing from the spirit and scope of the disclosure as defined by the following claims.

What is claimed is:
1. A power conversion system comprising:
a functional block of power electronics comprising a triple half-bridge architecture having a first branch with two transistors, a second branch with two transistors, and a third branch with two transistors, wherein the functional block has a first side and a second side opposite the first side;
a first set of switches disposed between the first side of the functional block and an AC power component, wherein the first set of switches selectively couples the AC power component to the first, second, and third branches of the functional block;
a second set of switches disposed between the first side of the functional block and a first DC power component, wherein the second set of switches selectively couples the first DC power component to the first side of the functional block;
a third set of switches disposed between the second side of the functional block and the first DC power component, wherein the third set of switches selectively couples the first DC power component to the second side of the functional block;
a fourth set of switches disposed between the second side of the functional block and a second DC power component, wherein the fourth set of switches selectively couples the second DC power component to the second side of the functional block;
a fifth switch disposed along a line between the first branch and the third branch of the functional block;
an inductor coupled to the functional block, wherein the inductor is disposed between the first set of switches and the functional block, and wherein the line having the fifth switch is disposed between the first set of switches and the inductor;
a sixth switch disposed within the functional block between the second and third branches of the functional block; and
a controller communicatively coupled to the power electronics of the functional block, the first, second, third, and fourth sets of switches, and the fifth and sixth switches, wherein the controller is configured to control the functional block to selectively convert power between the AC power component and the first DC power component, to convert power between the AC power component and the second DC power compo- nent, and to convert power between the first DC power component and the second DC power component.

2. The power conversion system of claim 1, wherein the functional block is operable as a rectifier, an inverter, a buck converter, or a boost converter.

3. The power conversion system of claim 1, wherein the inductor is configured to operate as a filter component when the functional block operates as a rectifier or an inverter and to operate as an energy storage component when the functional block operates as a buck converter or a boost converter.

4. The power conversion system of claim 1, wherein the controller is configured to provide interleaved control of the functional block to enable DC/DC conversions between the first and second DC power components.

5. The power conversion system of claim 1, wherein the first DC power component comprises a battery in a vehicle and wherein the second DC power component comprises a stationary battery.

6. The power conversion system of claim 1, wherein the AC power component comprises an AC power grid.

7. A method, comprising:
controlling a first set of switches disposed between an AC power component and a first side of a first functional block of power electronics to selectively couple the AC power component to the first functional block, wherein the first functional block comprises a triple half-bridge architecture having the first side and a second side opposite the first side;
controlling a second set of switches disposed between a first DC power component and the first side of the first functional block to selectively couple the first DC power component to the first side of the first functional block;
controlling a third set of switches disposed between the first DC power component and the second side of the first functional block to selectively couple the first DC power component to the second side of the first functional block;
controlling a fourth set of switches disposed between a second DC power component and the second side of the first functional block to selectively couple the second DC power component to the first functional block;
controlling a fifth set of switches disposed between the AC power component and a first side of a second functional block of power electronics to selectively couple the AC power component to the second functional block, wherein the second functional block comprises a triple half-bridge architecture having the first side and a second side opposite the first side;
controlling a sixth set of switches disposed between the first DC power component and the first side of the second functional block to selectively couple the first DC power component to the first side of the second functional block;
controlling a seventh set of switches disposed between the first DC power component and the second side of the second functional block to selectively couple the first DC power component to the second side of the second functional block;
controlling an eighth set of switches disposed between the second DC power component and the second side of the second functional block to selectively couple the second DC power component to the second functional block; and
controlling the power electronics of the first and second functional blocks to selectively convert power between the AC power component and the first DC power component, to convert power between the AC power component and the second DC power component, and to convert power between the first DC power component and the second DC power component.

8. The method of claim 7, wherein controlling the power electronics of the first and second functional blocks comprises operating one or both of the functional blocks as an inverter or a rectifier, and wherein controlling the power electronics of the first and second functional blocks comprises operating the one or both of the functional blocks as a buck or boost converter.

9. The method of claim 7, further comprising:
filtering power through an inductor coupled to the first or second functional block when the power electronics are controlled to convert power between the AC power component and the first DC power component or between the AC power component and the second DC power component; and
storing energy in the inductor when the power electronics are controlled to convert power between the first and second DC power components.

10. The method of claim 7, further comprising facilitating buck and boost power conversions between the first and second DC power components in either direction.

11. The method of claim 7, further comprising providing interleaved control of the first functional block to convert power between the first and second DC power components.

12. The method of claim 7, further comprising controlling the power electronics of the first functional block and the second functional block to selectively provide power from two of the AC or DC power components to another one of the AC or DC power components at the same time, and to selectively provide power from one of the AC or DC power components to another two of the AC or DC power components at the same time.

13. The method of claim 12, further comprising controlling the power electronics of the first functional block and the second functional block to provide power from the AC power component and from the first DC power component at the same time to charge the second DC power component, and to provide power from the AC power component to recharge the first DC power component after charging the second DC power component.

14. The method of claim 13, wherein the first DC power component comprises a stationary battery, the second DC power component comprises a battery in a vehicle, and the AC power component comprises an AC power grid.

15. The method of claim 12, further comprising controlling the power electronics of the first functional block and the second functional block to balance and schedule a power flow from two of the AC or DC power components to provide a constant power flow to another one of the AC or DC power components.

16. A power conversion system comprising:
a functional block of power electronics comprising a triple half-bridge architecture having a first branch with two transistors, a second branch with two transistors, and a third branch with two transistors, wherein the functional block has a first side and a second side opposite the first side;
a first set of switches disposed between the first side of the functional block and an AC power component, wherein the first set of switches selectively couples the AC power component to the first, second, and third branches of the functional block;
a second set of switches disposed between the first side of the functional block and a first DC power component, wherein the second set of switches selectively couples the first DC power component to the first side of the functional block;
a third set of switches disposed between the second side of the functional block and a second DC power component, wherein the third set of switches selectively couples the second DC power component to the second side of the functional block;
a fourth switch disposed along a line coupled between the first branch and the third branch of the functional block;
an inductor coupled to the functional block, wherein the inductor is disposed between the first set of switches and the functional block, and wherein the line having the fourth switch is disposed between the inductor and the functional block;
a second inductor disposed along the line having the fourth switch;
a fifth switch disposed within the functional block between the second and third branches of the functional block; and
a controller communicatively coupled to the power electronics of the functional block, the first, second, and third sets of switches, and the fourth and fifth switches, wherein the controller is configured to control the functional block to selectively convert power between the AC power component and the first DC power component, to convert power between the AC power component and the second DC power component, and to convert power between the first DC power component and the second DC power component.

17. The power conversion system of claim 16, wherein the functional block is operable as a rectifier, an inverter, a buck converter, or a boost converter.

18. The power conversion system of claim 16, wherein the inductor is configured to operate as a filter component when the functional block operates as a rectifier or an inverter and to operate as an energy storage component when the functional block operates as a buck converter or a boost converter.

19. The power conversion system of claim 16, wherein the controller is configured to provide interleaved control of the functional block to enable DC/DC conversions between the first and second DC power components.

20. The power conversion system of claim 16, wherein the first DC power component comprises a battery in a vehicle and wherein the second DC power component comprises a stationary battery.

21. The power conversion system of claim 16, wherein the AC power component comprises an AC power grid.

* * * * *